(12) United States Patent
Imanishi et al.

(10) Patent No.: US 11,790,167 B2
(45) Date of Patent: *Oct. 17, 2023

(54) INFORMATION PROCESSING APPARATUS, INFORMATION PROCESSING METHOD, AND STORAGE MEDIUM

(71) Applicant: NEC Corporation, Tokyo (JP)

(72) Inventors: Masako Imanishi, Tokyo (JP); Yousuke Motohashi, Tokyo (JP); Koichi Todo, Tokyo (JP); Sawako Umezu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,408

(22) Filed: May 9, 2022

(65) Prior Publication Data

US 2022/0261542 A1  Aug. 18, 2022

Related U.S. Application Data

(63) Continuation of application No. 16/761,862, filed as application No. PCT/JP2018/040828 on Nov. 2, 2018, now Pat. No. 11,347,942.

(30) Foreign Application Priority Data

Nov. 7, 2017  (JP) .................................. 2017-214979

(51) Int. Cl.
*G06F 40/237* (2020.01)
*G06F 16/9032* (2019.01)
(Continued)

(52) U.S. Cl.
CPC ...... *G06F 40/237* (2020.01); *G06F 16/90332* (2019.01); *G06F 40/174* (2020.01);
(Continued)

(58) Field of Classification Search
CPC ............ G06F 40/237; G06F 16/90332; G06F 40/174; G06F 40/289; G06F 40/211;
(Continued)

(56) References Cited

U.S. PATENT DOCUMENTS

| 2007/0022099 | A1* | 1/2007 | Yoshimura | .......... G06F 16/3329 |
| 2011/0282653 | A1* | 11/2011 | Tamura | .................. G06F 40/45 704/9 |

(Continued)

FOREIGN PATENT DOCUMENTS

| JP | H10-222725 A | 8/1998 |
| JP | 2001-357172 A | 12/2001 |

(Continued)

OTHER PUBLICATIONS

International Search Report for PCT/JP2018/040626, dated Jan. 29, 2019.

(Continued)

*Primary Examiner* — Quoc A Tran

(57) ABSTRACT

An information processing apparatus according to the present invention includes: an acceptance unit that accepts a process request to an operation system; a specifying unit that, based on the process request, specifies an operation task to be executed in the operation system; an extraction unit that performs text analysis on the process request and extracts an answer item corresponding to an input item required at execution of the operation task from the process request; and an execution unit that executes the operation task based on the answer item.

6 Claims, 20 Drawing Sheets

(51) Int. Cl.
| | |
|---|---|
| *G06F 40/289* | (2020.01) |
| *G06F 40/174* | (2020.01) |
| *G06F 40/247* | (2020.01) |
| *G06F 40/211* | (2020.01) |
| *G06F 40/268* | (2020.01) |
| *G06N 5/025* | (2023.01) |
| *G06N 5/00* | (2023.01) |
| *G06N 3/02* | (2006.01) |
| *G06N 5/022* | (2023.01) |
| *G10L 13/033* | (2013.01) |
| *G06N 20/20* | (2019.01) |
| *G06N 20/00* | (2019.01) |
| *G06N 3/08* | (2023.01) |
| *G06N 5/01* | (2023.01) |
| *G06F 17/00* | (2019.01) |

(52) U.S. Cl.
CPC .......... *G06F 40/289* (2020.01); *G06F 40/211* (2020.01); *G06F 40/247* (2020.01); *G06F 40/268* (2020.01); *G06N 3/02* (2013.01); *G06N 3/08* (2013.01); *G06N 5/00* (2013.01); *G06N 5/01* (2023.01); *G06N 5/013* (2023.01); *G06N 5/022* (2013.01); *G06N 5/025* (2013.01); *G06N 20/00* (2019.01); *G06N 20/20* (2019.01); *G10L 13/033* (2013.01)

(58) Field of Classification Search
CPC ...... G06F 40/247; G06F 40/268; G06F 40/35; G06F 3/0481; G06F 3/16; G06F 40/30; G06N 3/02; G06N 3/08; G06N 5/00; G06N 5/01; G06N 5/013; G06N 5/022; G06N 5/025; G06N 20/00; G06N 20/20; G10L 13/033; G06Q 10/06
See application file for complete search history.

(56) References Cited

U.S. PATENT DOCUMENTS

| | | | | |
|---|---|---|---|---|
| 2015/0279350 A1 | 10/2015 | Onishi | .................... | G06F 40/40 704/201 |
| 2016/0125013 A1* | 5/2016 | Barborak | ................ | G06F 16/36 707/748 |
| 2016/0162474 A1* | 6/2016 | Agarwal | ................ | G06Q 30/00 704/9 |

FOREIGN PATENT DOCUMENTS

| | | | |
|---|---|---|---|
| JP | 2003-088675 | A | 3/2003 |
| JP | 2007-179239 | A | 7/2007 |
| JP | 2011-253348 | A | 12/2011 |
| JP | 2013-517566 | A | 5/2013 |
| JP | 2014-178915 | A | 9/2014 |
| JP | 2017-130114 | A | 7/2017 |
| JP | 2018-128943 | A | 8/2018 |
| JP | WO2019/093239 | A1 | 5/2019 |
| WO | 2013/080406 | A1 | 6/2013 |

OTHER PUBLICATIONS

JP Office Action for JP Application No. 2022-139022, dated Aug. 1, 2023 with English Translation.

Tsuhannews, "Redelivery request on LINE talk, Yamato Transport strengthens inquiry function", Nov. 7, 2016, Tsuhantsushin ECMO[Online], Internet <https://www.tsuhannews.jp/shopblogs/detail/58400>, pp. 1-5.

* cited by examiner

TASK SETTING

| Scenario ID | Transportation |
|---|---|
| Operation task ID | Apply_TransExp |
| Start condition | Model_StartCon |
| Interruption condition | Model_ExitCon |
| Input item ID | Date_use, From_station, To_station, Via_station, kbn_way |
| Ending process | script_001(User_id, Date, From_station, To_station, Via_station , kbn_way) |

FIG. 3B

INPUT CONDITION SETTING

| Input item ID | Date_use | kbn_way |
|---|---|---|
| Question passage | "When is the date of use?" | (Result of route search) + "Is it a round-trip?" |
| Type | Date type | Yes/No type |
| Answer determination condition | Model_Date | |
| External system cooperation | | Search_Route(From_station, To_station , Via_station,...) |

FIG. 4

| Input item ID | Setting value |
|---|---|
| Date_use | 2017/11/16 |
| From_station | Mita |
| To_station | Otemachi |
| Via_station | |
| fare | 216 |
| kbn_way | 1 |

FIG. 5

| Operation task ID | Argument |
|---|---|
| Apply_TransExp | User_id, Date_use, From_station, To_station, Via_station |
| Search_Route | From_station, To_station , Via_station , result_route(route_nm, fare) |
| Regist_Schedule | User_id, Date, From_time, To_time, schedule_nm |
| Change_Delivery | number, deliveryDate, deliverytime |

INFORMATION PROCESSING APPARATUS, INFORMATION PROCESSING METHOD, AND STORAGE MEDIUM

CROSS-REFERENCE TO RELATED APPLICATIONS

The present application is a continuation application of U.S. patent application Ser. No. 16/761,862 filed on May 6, 2020, which is a National Stage Entry of international application PCT/JP2018/040828 filed on Nov. 2, 2018, which claims the benefit of priority from Japanese Patent Application 2017-214979 filed on Nov. 7, 2017, the disclosures of all of which are incorporated in their entirety by reference herein.

TECHNICAL FIELD

The present invention relates to an information processing apparatus, an information processing method, and a storage medium.

BACKGROUND ART

Patent Literature 1 discloses an intelligence automatic assistant system that accepts a process request from a user in an interactive form, calls an external service based on input data, and thereby performs a search process or a registration process.

CITATION LIST

Patent Literature

PTL 1: Japanese Patent Application Publication No. 2013-517566

SUMMARY OF INVENTION

Technical Problem

The system disclosed in Patent Literature 1 extracts necessary information from answers based on a predetermined rule. Thus, in order for the system to accurately support a difference in meaning according to a context, an inconsistency in written forms, or the like for the same word, it is necessary to predict answer patterns of users to questionnaires and register a large number of rules in advance.

Accordingly, in view of the above problem, the present invention intends to provide an information processing apparatus, an information processing method, and a storage medium that can accurately analyze an input natural language and automatically set input items required in operating an operation system without requiring pre-registration of a large number of rules.

Solution to Problem

According to one example aspect of the present invention, provided is an information processing apparatus including: an acceptance unit that accepts a process request to an operation system; a specifying unit that, based on the process request, specifies an operation task to be executed in the operation system; an extraction unit that performs text analysis on the process request and extracts an answer item corresponding to an input item required at execution of the operation task from the process request; and an execution unit that executes the operation task based on the answer item.

According to another example aspect of the present invention, provided is an information processing method including: accepting a process request to an operation system; based on the process request, specifying an operation task to be executed in the operation system; performing text analysis on the process request and extracting an answer item corresponding to an input item required at execution of the operation task from the process request; and executing the operation task based on the answer item.

According to yet another example aspect of the present invention, provided is a storage medium storing a program that causes a computer to perform: accepting a process request to an operation system; based on the process request, specifying an operation task to be executed in the operation system; performing text analysis on the process request and extracting an answer item corresponding to an input item required at execution of the operation task from the process request; and executing the operation task based on the answer item.

Advantageous Effects of Invention

According to the present invention, it is possible to provide an information processing apparatus, an information processing method, and a storage medium that can accurately analyze an input natural language and automatically set an input item required in operating an operation system without requiring pre-registration of a large number of rules.

BRIEF DESCRIPTION OF DRAWINGS

FIG. 2 is a diagram illustrating a specific example of an entry window of an operation system in the first example embodiment.

FIG. 3A is a diagram illustrating an example of data items of an interaction setting storage unit in the first example embodiment.

FIG. 3B is a diagram illustrating an example of data items of the interaction setting storage unit in the first example embodiment.

FIG. 4 is a diagram illustrating an example of data items of a user answer storage unit in the first example embodiment.

FIG. 5 is a diagram illustrating an example of data items of an RPA setting storage unit in the first example embodiment.

DESCRIPTION OF EMBODIMENTS

Figure 1:
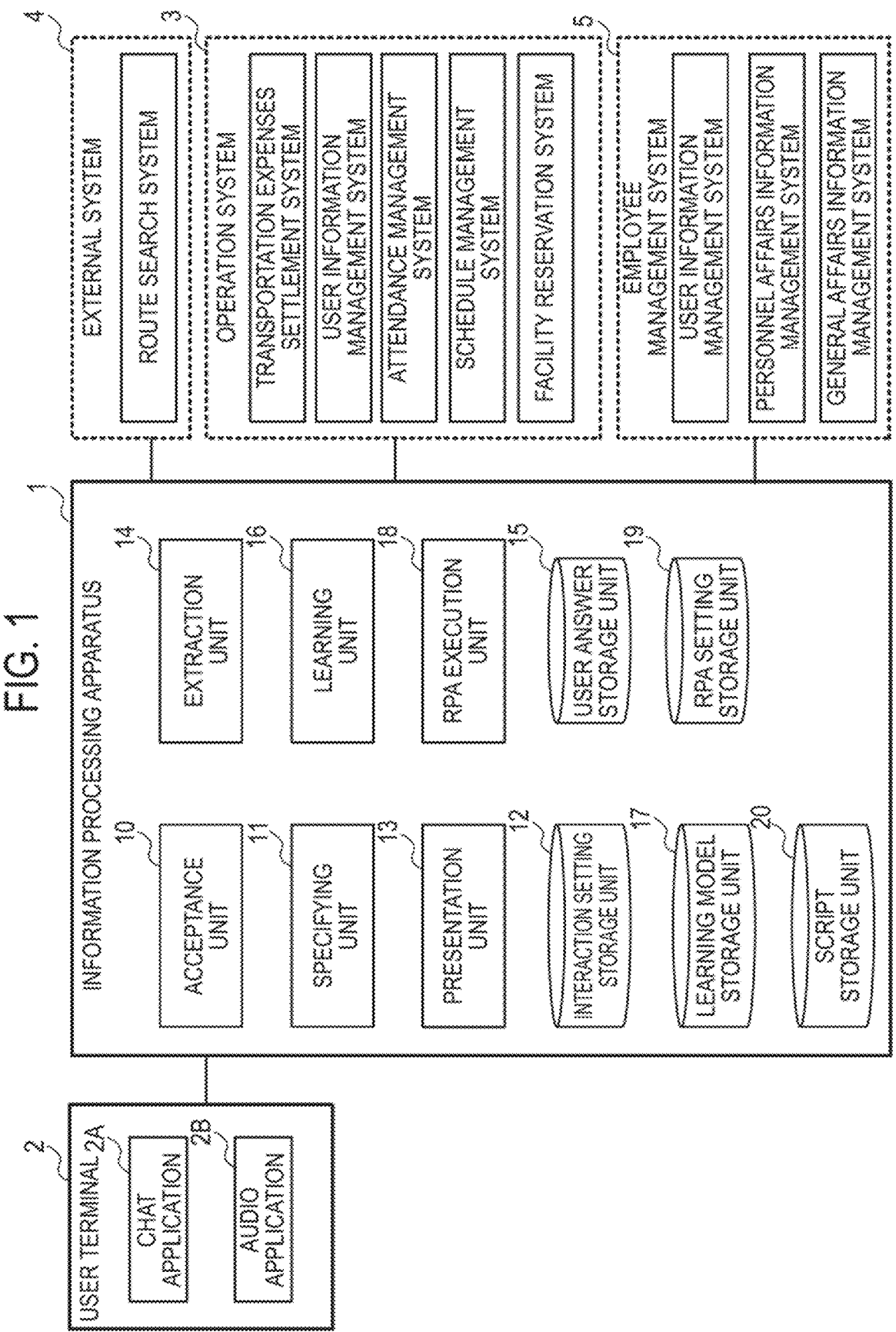
FIG. 1 is a block diagram illustrating the function of an information processing apparatus according to a first example embodiment.

Example embodiments of the present invention will be described below with reference to the drawings. Note that, in the drawings described below, components having the same function or corresponding functions are labeled with the same references, and repeated description thereof will be omitted.

First Example Embodiment

FIG. 1 is a block diagram illustrating the function of an information processing apparatus 1 according to a first example embodiment. The information processing apparatus 1 is connected to a user terminal 2, an operation system 3 including various systems, an external system 4, and an employee management system 5 via a communication network (not illustrated) (for example, a wired LAN, a wireless LAN, the Internet, or the like). The information processing apparatus 1 is a computer that accepts a process request from the user terminal 2 in an interactive form and performs an operation task in the operation system 3. The user terminal 2 is a work station such as a smartphone, a tablet terminal, a personal computer, or the like in which an interaction application is installed. The operation system 3 is a computer system used for performing registration, update, or reference of operation data, such as a transportation expenses settlement system, an attendance management system, a schedule management system, a facility reservation system, or the like. Further, the external system 4 is a computer system provided by a business entity that is different from the operation system 3, and a route search system is illustrated as an example in the present example embodiment. The employee management system 5 may be a user information management system, a human resource information management system, a general affairs information management system, or the like.

Figure 2:
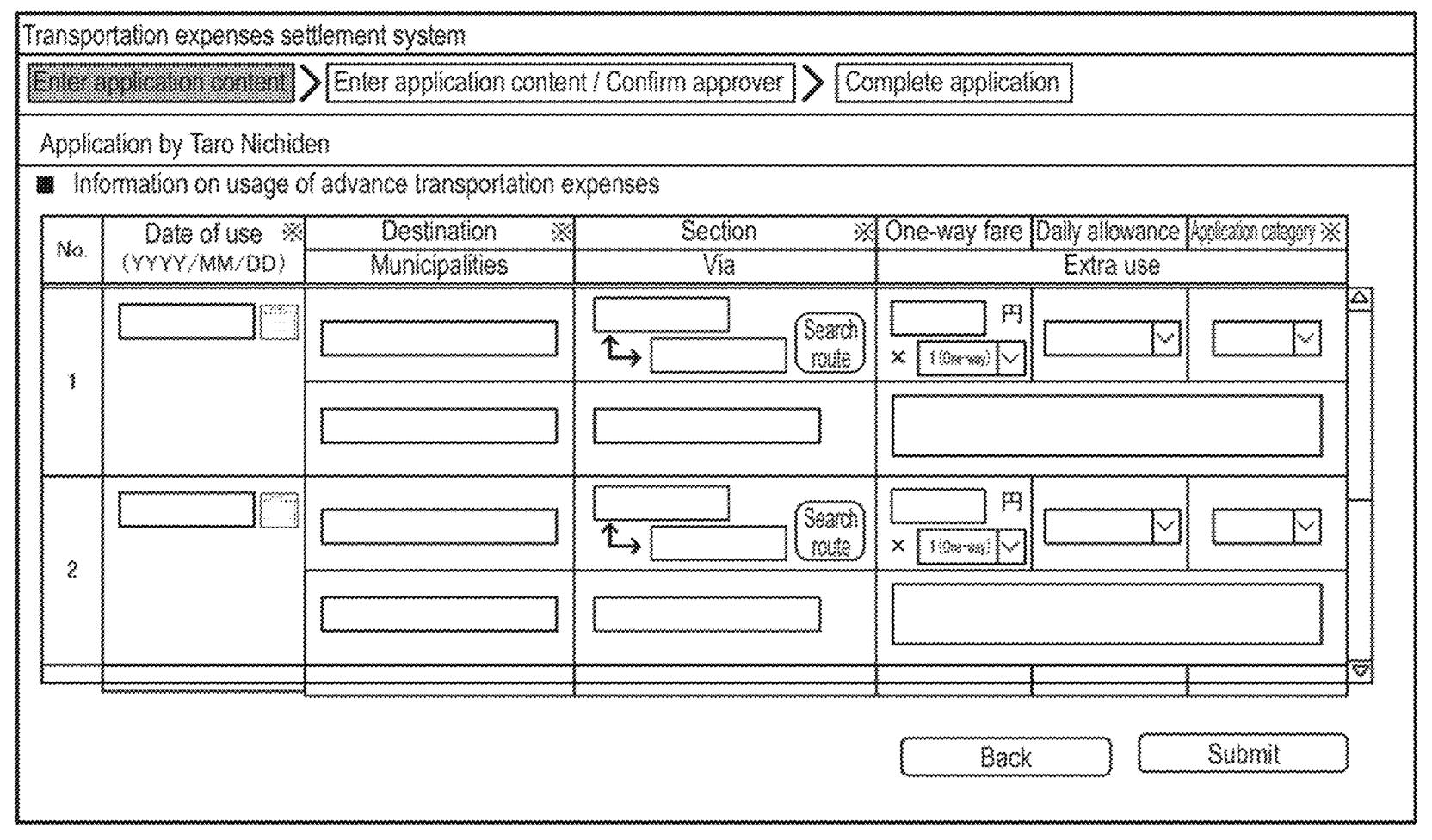

FIG. 2 is a diagram illustrating a specific example of an entry window of the operation system 3 in the first example embodiment. In this example, an application content entry window is illustrated by which the user sets input items such as "date of use", "destination", "section of route", "one-way fare", "one-way/round-trip category", "daily allowance", "application category", or the like, respectively, when applying transportation expenses at a business trip. The information processing apparatus 1 according to the present example embodiment automatically performs operation on the operation system 3 as illustrated in FIG. 2 instead of the user. The configuration of information processing apparatus 1 will be described below in detail.

As illustrated in FIG. 1, the information processing apparatus 1 has an acceptance unit 10, a specifying unit 11, an interaction setting storage unit 12, a presentation unit 13, an extraction unit 14, a user answer storage unit 15, a learning unit 16, a learning model storage unit 17, an RPA execution unit 18, an RPA setting storage unit 19, and a script storage unit 20.

The acceptance unit 10 accepts a process request to the operation system 3 input from the user terminal 2. In the present example embodiment, the process request is referred to as "task-specifying passage". For example, a sentence including a purpose that the user wants to achieve in the operation system 3 including various systems, such as "I want to have my travel expenses settled", "settlement of train fare", "change of delivery date and time", "reservation of a meeting room", or the like corresponds to a task-specifying passage (task declaration passage). Note that the acceptance unit 10 can support input of both a task achievement-type interaction and a task non-achievement-type interaction. The task achievement-type interaction is an interactive form in which a passage to specify a task is input first and a question and an answer are repeated alternatingly. An example may be an interaction in which a task-specifying passage of "what is the weather like now?" is input from the user terminal 2, and in response, a question of "which location of the weather are you talking about?" is provided from the information processing apparatus 1, and "Minato ward in Tokyo" is input again from the user terminal 2. Since the task can be specified from the initial input, there is an advantage of topics being narrowed before making a question. In contrast, the task non-achievement-type interaction is an interactive form in which a task-specifying passage and an answer are provided together. An example may be an interactive form such as "what is the weather like tomorrow in Minato ward?". According to such an interactive form, when the user provides information required for a process at once, a quick process is enabled without repetition of questions.

The specifying unit 11 references storage information in the interaction setting storage unit 12, performs text analysis on a task-specifying passage input from the acceptance unit 10, and specifies an operation task to be executed in the operation system 3. Herein, the "text analysis" is a generic term for technologies of analyzing text information input or converted by using morphological analysis, syntax analysis (parsing), synonym term extraction, span extraction, implication recognition, or the like. The "morphological analysis" is a process of sectioning a sentence into morphemes, each of which is the minimum unit having a meaning as a language, and applying information such as a base form, a part of speech, or the like thereto.

The "syntax analysis" is referred to as dependency analysis and is a process of calculating naturalness as dependency between a word and a clause, provided that a predetermined structural constriction is satisfied, and determining the dependency between the word and the clause.

The "synonym term extraction" is a process of inputting text information to be processed and extracting a pair of synonym terms having the same meaning but different written forms. For example, synonym terms may be extracted and stored for each particular domain (field) such as an IT-related domain, a machine-related domain, a cooking-related domain, or the like.

The "span extraction" is a process of using a model learned from learning data and automatically cutting and extracting an important section from the input sentence. An exemplary scheme of the span extraction may be Conditional Random Field (CRF). For example, a case where three passages "I am going to travel to Hawaii with my family", "I am going to travel to America next month", and "destination is New York" are input as learning data will be described. In such a case, with learning of the learning data, it is determined that the word after "travel" and "to" is highly likely to be the destination. As a result, when the passage "I am going to travel to Italy" is input as unknown data, "Italy" can be extracted as the destination. Further, the "implication recognition" is a process of, for two passages (sentences), determining whether or not one of the sentences (target sentence) includes the meaning represented by the other sentence (hypothesis sentence).

Further, the specifying unit 11 references a model file when performing text analysis. The model file is a model created by machine learning. The learning unit 16 described later collects a large number of correct pairs of a natural language and an answer item in order to extract an answer item from a natural language in the extraction unit 14 and performs machine learning by using the data (training data). Thereby, the learning unit 16 generates a model file so as to be able to extract an answer item from an input text. The interaction setting storage unit 12 stores a task setting that defines an execution condition of an operation task and an input condition setting that defines an input condition of an input item required at execution of the operation task.

FIG. 3A and FIG. 3B are diagrams illustrating an example of data items in the interaction setting storage unit 12 in the first example embodiment. In FIG. 3A, there are items of an operation task ID unique to each operation task, a start condition and an interruption condition of the operation task, an input item ID of an input item required for execution of the operation task, and a process at the end of the operation task, and data examples for respective items are illustrated. The order of input item IDs indicates a question order. For example, when a task-specifying passage of "settlement of train fare" is input, the specifying unit 11 performs text analysis based on a model file ("Model_StartCon") defining the start condition and specifies an operation task ID ("Apply_TransExp"). Further, the input items required when the above task is executed are a date of use ("Date_use"), a departure station ("From_station"), a destination station ("To_station"), a via station ("Via_station"), and a one-way/round-trip category ("kbn_way"). Further, it is indicated that a script "Script_001" is executed as the ending process.

In FIG. 3B, there are item examples of an input item ID, a question passage corresponding to the input item, a data type of the input item, an answer determination condition, and an external system cooperation, and data examples for respective items are illustrated. For example, it is indicated that, when the input item ID is "Date_use", "When is the date of use?" is presented as a question passage, the data type of set data is "date type", and a model file "Model_Date" is used as the answer determination condition.

Further, it is indicated in a case of the input item ID "kbn_way" that a question passage in which a route search result from the external system cooperation and a sentence of "Is it a round-trip?" are combined is presented and that the data type is "Yes/No type" and a program called as the external system cooperation is "Search Route" of the route search system.

Note that, although a model file is used as the start condition, an interruption condition, and an answer determination condition of an operation task in FIG. 3A and FIG. 3B, the example embodiment is not limited to the model determination form. For example, a regular expression form such as "*change of date and time*", "*quit*", "xxxx-xxxx-xxx [0-9]+", or the like may be used together. Further, another data type in the input condition setting may include a character string type, a numerical value type, or a model type.

The presentation unit 13 requests input items required at execution of an operation task and presents a question passage related to the input item to the user terminal 2 side. The number of input items and question passages is different for operation tasks. The acceptance unit 10 accepts an answer passage input at the user terminal 2 in response to the presented question passage.

The extraction unit 14 performs text analysis on the answer passage accepted by the acceptance unit 10 and extracts an answer item corresponding to the input item from the answer passages. The user answer storage unit 15 stores an answer item extracted by the extraction unit 14 as a setting value. FIG. 4 is a diagram illustrating an example of data item of the user answer storage unit 15 in the first example embodiment. In this example, "2017/11/16" is stored for the date of use ("Date_use"), "Mita" is stored for the departure station ("From_station"), "Otemachi" is stored for the destination station ("To_station"), "216" is stored for the one-way fare ("fare"), "1 (one-way)" is stored for the one-way/round-trip category ("kbn_way") as setting values, respectively.

The learning unit 16 stores a pair of an input answer passage and an answer item extracted from the answer passage in the user answer storage unit 15 as learning data. Further, when the extraction unit 14 correctly extracts an answer item from an answer passage, the learning unit 16 creates a learning model based on learning data and stores the created learning model in the learning model storage unit 17. The extraction unit 14 uses a learning model corresponding to an input item for text analysis.

The RPA execution unit 18 sets an answer item as an argument to load a script corresponding to an operation task from the script storage unit 20 and execute the operation task. Herein, "Robotic Process Automation (RPA)" is software that operates various applications on behalf of a person in back-office operations such as accounting, general affairs, or the like, for example, and is referred to as a virtual intellectual labor (Digital Labor). That is, the RPA is software used for operating software and can automate a typical operation such as manual entry of data.

FIG. 5 is a diagram illustrating an example of data item of the RPA setting storage unit 19 in the first example embodiment. In this example, with respect to the RPA setting storage unit 19, an operation task ID and an argument used for executing a script are the setting items, and examples of data thereof are indicated.

Figure 6:
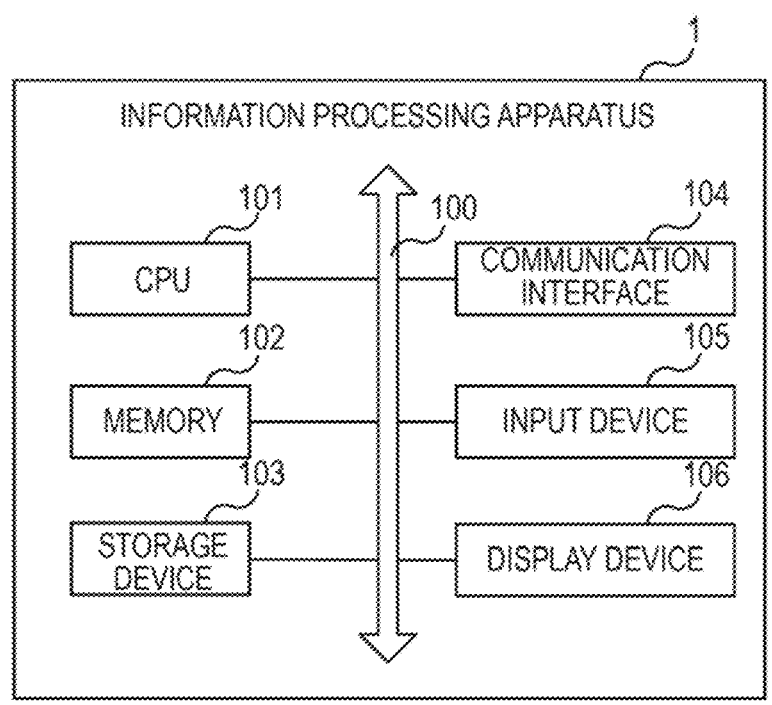
FIG. 6 is a block diagram illustrating an example of a hardware configuration of the information processing apparatus according to the first example embodiment.

FIG. 6 is a block diagram illustrating a hardware configuration example of the information processing apparatus 1 according to the first example embodiment. The information processing apparatus 1 has a central processing unit (CPU) 101, a memory 102, a storage device 103, a communication interface 104, an input device 105, and a display device 106.

The CPU 101 is a processor that loads and executes a program stored in the storage device 103 on the memory 102 and thereby performs overall control and calculation processing of the information processing apparatus 1. Further, the CPU 101 stores data of a process result in the storage device 103 and externally transmits the data of the process result via the communication interface 104.

The memory 102 includes a random access memory (RAM) or the like that temporarily stores data being processed by the CPU 101 or data read from the storage device 103.

The storage device 103 stores a program to be executed by the CPU 101, data that is a result of a process performed by a program, or the like. The storage device 103 includes a read only memory (ROM) dedicated to reading or a hard disk drive, a flash memory, or the like that are readable and writable. Further, the storage device 103 may include a computer readable portable storage medium such as a CD-ROM.

The communication interface 104 is a communication unit that transmits and receives data and is configured to be able to perform a communication scheme of at least one of wired communication and wireless communication. The communication interface 104 includes a processor, an electrical circuit, an antenna, a connection terminal, or the like required for the above communication scheme. The communication interface 104 performs communication using the above communication scheme in accordance with a signal from the CPU 101.

The input device 105 includes a keyboard or the like that accepts input from the user and transmits the input content to the CPU 101 as a signal. A touchscreen in which the input device 105 and the display device 106 are integrated may be used.

The display device 106 is a display device that displays predetermined information in accordance with a signal from the CPU 101. As the display device 106, any display device such as a liquid crystal display may be used.

Note that the information processing apparatus 1 is not limited to the hardware configuration illustrated in FIG. 6 but may further include another device. The information processing apparatus 1 may be formed of one or a plurality of devices or may be integrally configured with another device. Further, the information processing apparatus 1 may be connected to a separate apparatus, and at least a part of processing performed by the information processing apparatus 1 in the present example embodiment may be performed by the another apparatus.

Subsequently, the operation of the information processing apparatus 1 according to the first example embodiment will be described with reference to FIG. 7 to FIG. 10.

Figure 7:
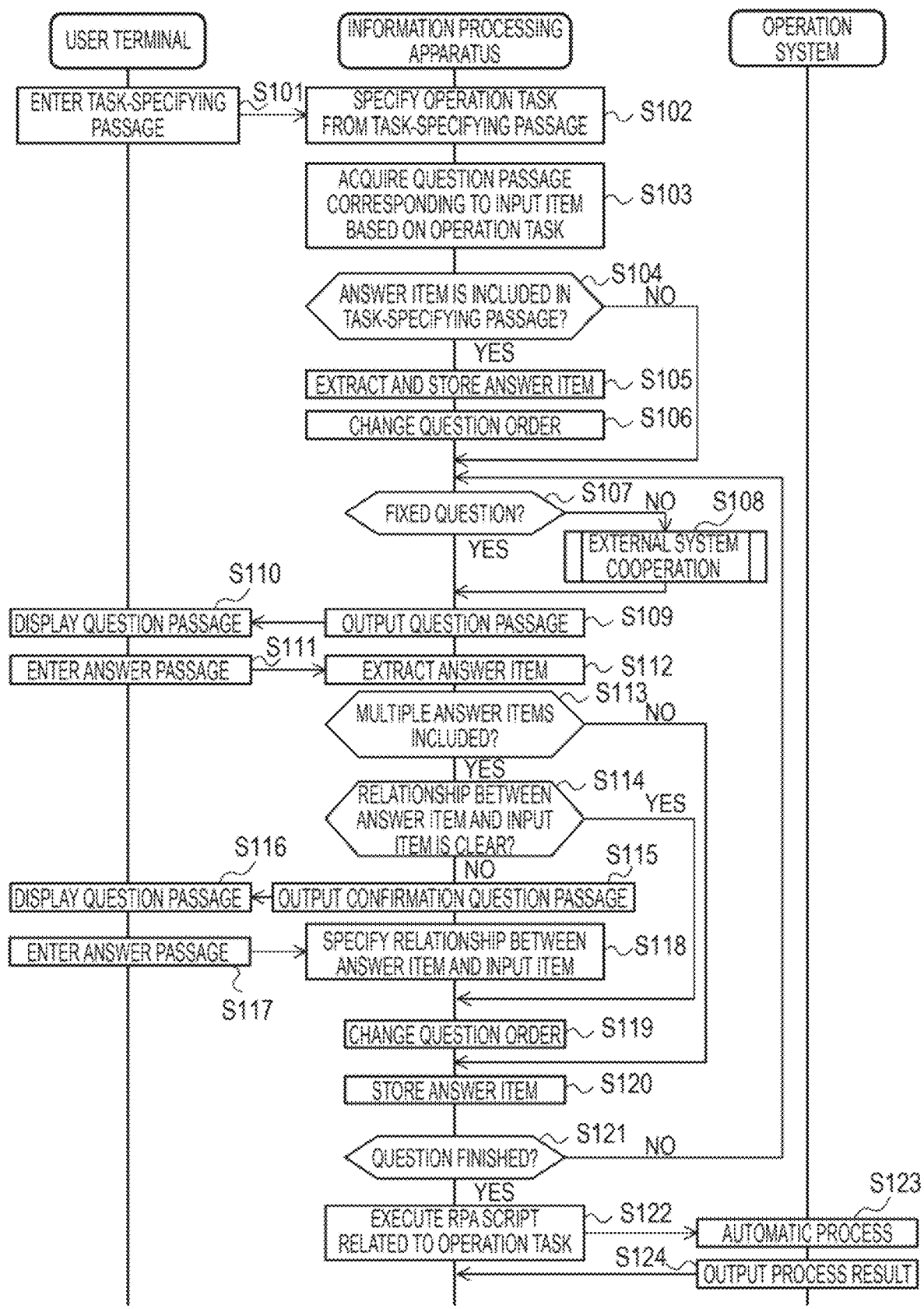
FIG. 7 is a sequence diagram illustrating an example of operations between the information processing apparatus, a user terminal, and the operation system according to the first example embodiment.
Figure 8:
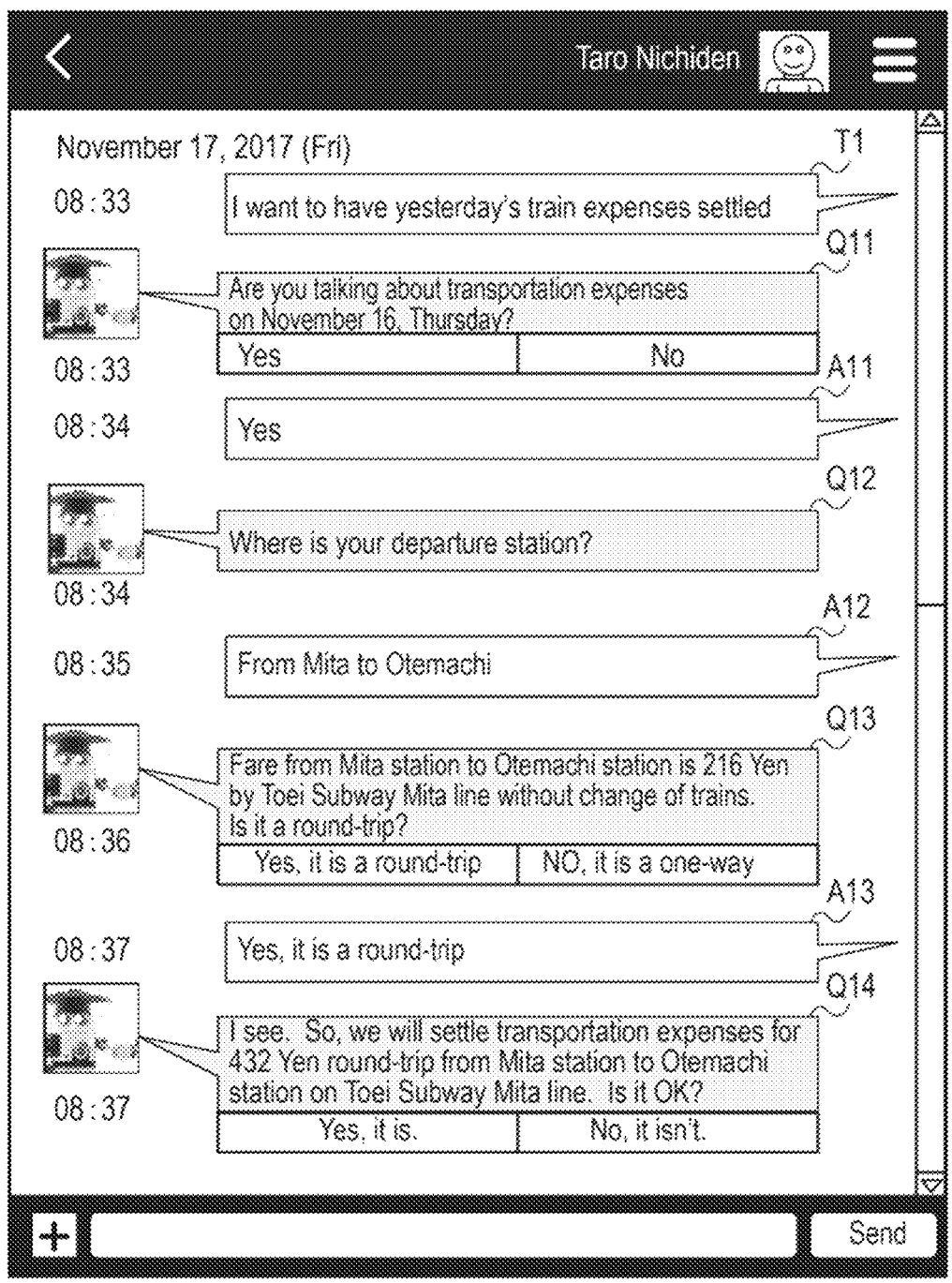
FIG. 8 is a diagram illustrating one example of an interactive window of the user terminal in the first example embodiment.
Figure 9:
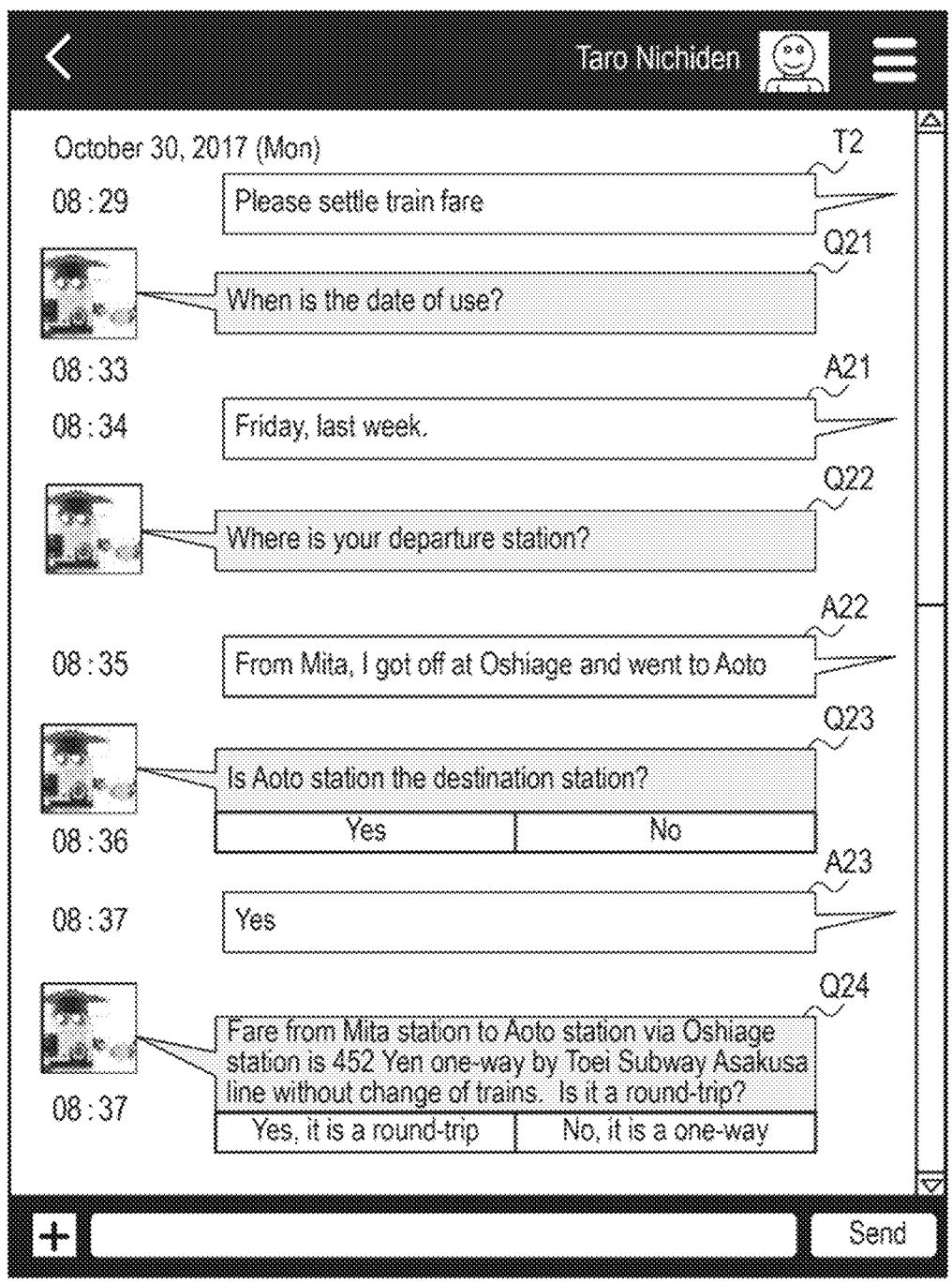
FIG. 9 is a diagram illustrating one example of an interactive window of the user terminal in the first example embodiment.

FIG. 7 is a sequence diagram illustrating an example of operations between the information processing apparatus 1, the user terminal 2, and the operation system 3 according to the first example embodiment. FIG. 8 and FIG. 9 is a diagram illustrating an example of an interactive window of the user terminal 2 in the first example embodiment. In this example, speech balloons from the right side of the window represent input contents from the user terminal 2, and speech balloons from the left side of the window represent output contents (question passages) from the information processing apparatus 1.

First, once the user inputs a task-specifying passage at the user terminal 2 (step S101), the specifying unit 11 of the information processing apparatus 1 performs text analysis on the task-specifying passage accepted by the acceptance unit 10 to specify an operation task and outputs the operation task ID thereof to the presentation unit 13 (step S102).

In FIG. 8, when a natural passage (task-specifying passage T1) of "I want to have yesterday's train expenses settled" is input at the user terminal 2, question passage Q11 is presented. It is indicated in question passage Q11 that, even when ambiguous input of "train expenses settled" is included in task-specifying passage T1, an operation task of "transportation expenses settlement" was able to be specified by text analysis.

Next, the presentation unit 13 of the information processing apparatus 1 acquires question passages and question order corresponding to an input item required in executing the operation task from the interaction setting storage unit 12 based on the operation task ID (step S103).

Next, the extraction unit 14 of the information processing apparatus 1 determines whether or not an answer item is included in the task-specifying passage (step S104). Herein, if the extraction unit 14 determines that an answer item is included in the task-specifying passage (step S104: YES), the extraction unit 14 stores the answer item included in the task-specifying passage (step S105). In response, since no question is necessary for the answer item stored in step S105, the presentation unit 13 changes the question order (step S106). In contrast, the information processing apparatus 1 determines that no answer item is included in the task-specifying passage (step S104: NO), the process proceeds to the process of step S107.

In question passage Q11 in FIG. 8, the word of "yesterday" included in task-specifying passage T1 is converted into "on November 16 (Thursday)" based on the current date (November 17 (Friday)). That is, it is possible to support relative specification such as "yesterday". Then, in response to the "date of use" being fixed to "November 16" due to input of answer passage A1*l*, a question about "date of use" is omitted in the interaction illustrated in FIG. 8.

In step S107, the presentation unit 13 determines whether or not the question form related to a target input item corresponds to a fixed question. The "fixed question" refers to a fixed question passage described in advance in the input condition setting. The determination for a fixed question is performed in accordance with conditions described in the input condition setting. Herein, if the presentation unit 13 determines that the question form corresponds to a fixed question (step S107: YES), the process proceeds to the process of step S109. For example, this corresponds to a case of the input item "Date_use (date of use)" illustrated as an example in FIG. 3B.

In contrast, if the presentation unit 13 determines that the question form does not correspond to a fixed question (step S107: NO), the presentation unit 13 acquires a question passage created by execution of the external system cooperation process (step S108), and the process proceeds to the process of step S109. The question passage whose question form does not correspond to a fixed question means a question passage that varies in accordance with a process result in the external system 4. For example, this corresponds to a case of the input item "kbn_way (one-way/ round-trip category)" illustrated as an example in FIG. 3B. The external system cooperation process will be described later.

In step S109, in response to the presentation unit 13 outputting a question passage corresponding to the input item to the user terminal 2, the user terminal 2 displays the question passage on the screen (step S110).

Next, in response to the user inputting an answer passage to the question passage at the user terminal 2 (step S111), the extraction unit 14 performs text analysis on the answer passage accepted by the acceptance unit 10 and extracts an answer item indicated by the answer passage (step S112). Note that text analysis may be unnecessary for the answer passage to the Yes/No type question passage. Further, in a case of voice input, there are various answer patterns such as "Yes", "Yes, it is", "That's right", and the like as an answer meaning "Yes". In such a case, it is preferable to perform text analysis.

Next, the extraction unit 14 determines whether or not a plurality of answer items are extracted from the answer passage in step S112 (step S113). Herein, if the extraction unit 14 determines that a plurality of answer items are extracted (step S113: YES), the process proceeds to the process of step S114. In contrast, if the extraction unit 14 determines that a plurality of answer items are not extracted (step S113: NO), the process proceeds to the process of step S120.

In FIG. 8, in response to question passage Q12 ("Where is your departure station?"), answer passage A12 ("from Mita to Otemachi") is input. Answer passage A12 includes not only the answer item to the input item being questioned ("departure station") but also the answer item to another input item ("destination station"). Further, it can be said that the parts of "Mita" and "Otemachi" are ambiguous input to represent station names. In such a case, it is preferable to extract "Mita" as "Mita station" and "Otemachi" as "Otemachi station" based on a predetermined regular expression scheme. In FIG. 8, the information processing apparatus 1 presents question passage Q13 ("Fare from Mita station to Otemachi station is 216 Yen by Toei Subway Mita line without change of trains. Is it a round-trip?") in response to answer passage A12.

In step S114, the extraction unit 14 determines whether or not the correspondence between the plurality of answer items extracted from the answer passage and the input item is clear. Herein, if the extraction unit 14 determines that the correspondence between the answer items and the input item is clear (step S114, YES), the process proceeds to the process of step S119.

Although answer passage A12 in FIG. 8 includes not only an answer item to the input item being questioned ("departure station") but also an answer item to another input item ("destination station"), the correspondence between the answer items and the input item is clear after text analysis is performed on the answer passage A12. Thus, "Mita" is classified as "departure station", and "Otemachi" is classified as "destination station", as illustrated in question passage Q13.

In contrast, if the extraction unit 14 determines that the correspondence between the answer items and the input item is unclear (step S114: NO), the presentation unit 13 outputs a confirmation question passage to the user terminal 2 (step S115). In response, the user terminal 2 displays the question passage on the screen (step S116).

In FIG. 9, in response to question passage Q22 ("where is your departure station?"), answer passage A22 ("From Mita, I got off at Oshiage and went to Aoto") is input. In answer passage A22, it is clear that "departure station" is "Mita station". However, when the sentence such as answer passage A22 has not been learned, "via station" and "destination station" are processed as being unclear in the information processing apparatus 1. That is, both "Oshiage station" and "Aoto station" may be candidates of the "destination station". Thus, confirmation question passage Q23 ("Is Aoto station the destination station?") is presented to determine whether or not "Aoto station" should be classified as "destination station". When a confirmation question passage is created, a matching answer item will be selected by a question. It is therefore preferable that confirmation question passages be presented with respect to answer items in descending order of classification score indicating the correlation degree to the input item when the answer passage is classified based on a machine learning model. For example, in answer passage A22 described above, since the word "to" is followed immediately before "Aoto", the classification score related to "destination station" is higher for "Aoto station" than for "Oshiage station".

Next, in response to the user inputting the answer passage to the question passage at the user terminal 2 (step S117), the extraction unit 14 performs text analysis on the answer passage and extracts an answer item indicated by the answer passage. Thereby, the extraction unit 14 clarifies the correspondence between the plurality of answer items and the input item (step S118).

In FIG. 9, in response to the user answering "Yes" (A23) to question passage Q23, "Aoto station" is determined as an answer item to "destination station". Further, since the answer item of "via station" is blank, "Oshiage station" excluded by the previous answer (A23) is automatically allocated as an answer item of "via station". As a result, as indicated in the last question passage Q24 ("From Mita station via Oshiage station to Aoto station . . . "), the correspondence between three input items ("departure station", "via station", and "destination station") and the answer item is clarified.

Next, the presentation unit 13 changes the question order so as to omit a question related to the answer item whose correspondence to the input item has been clarified (step S119). In the example of a task setting illustrated in FIG. 3A, a question about "destination station (To_station)" is made after "departure station (From_station)" for an operation task of transportation expenses application. In the example of the interaction in FIG. 8, however, a question about "destination station" is omitted because the question has been answered in answer passage A12. Further, "via station" is omitted because there is no via station (transfer station) on the searched route.

Next, in response to storing the answer item corresponding to the input item in the user answer storage unit 15 (step S120), the extraction unit 14 determines whether or not questions about all the input items required to execute the operation task were finished (step S121). Herein, if the extraction unit 14 determines that questions about all the input items were finished (step S121: YES), the process proceeds to the process of step S122. In contrast, if the extraction unit 14 determines that questions about all the input items were not finished (step S121: NO), the process returns to the process of step S107.

In step S122, the RPA execution unit 18 reads a script related to the operation task from the script storage unit 20 and executes the script by using the answer items read from the user answer storage unit 15 as arguments.

In step S123, the operation system 3 performs an automatic process based on the script and outputs the process result thereof to the information processing apparatus 1 (step S124).

Figure 10:
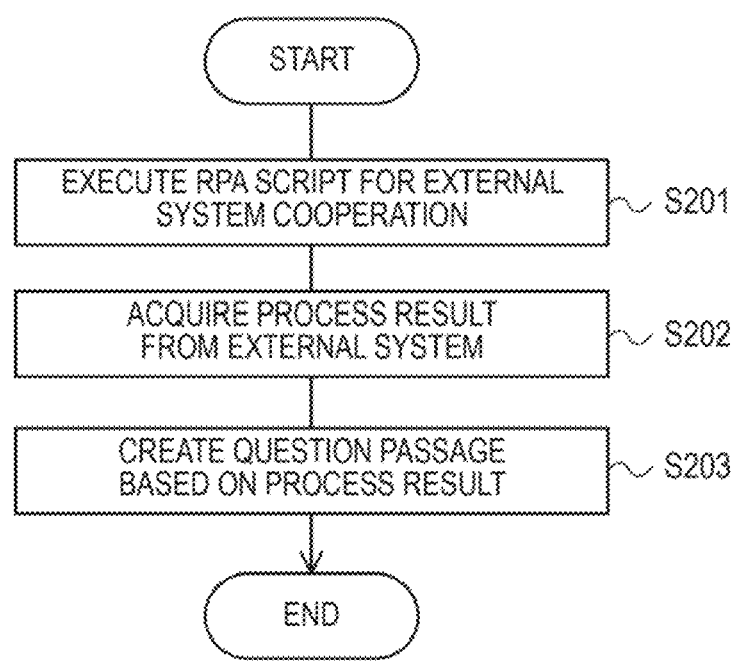
FIG. 10 is a flowchart illustrating one example of an external system cooperation process of the information processing apparatus according to the first example embodiment.

FIG. 10 is a flowchart illustrating one example of an external system cooperation process in the information processing apparatus 1 according to the first example embodiment. This process is performed when a script and an argument for the external system cooperation are specified as a question form of a question passage related to an input item in an input condition setting of the interaction setting storage unit 12.

First, the RPA execution unit 18 reads a script related to an operation task from the script storage unit 20, acquires an answer item to be set as an argument from the user answer storage unit 15, and executes the script (step S201).

Next, the RPA execution unit 18 acquires a process result based on the script from the external system 4 (step S202) and outputs the process result to the presentation unit 13.

The presentation unit 13 then creates a question passage related to an input item based on the process result (step S203). The created question passage is output to the user terminal 2 (step S109 of FIG. 7).

The part "is 216 Yen by Toei Subway Mita line without change of trains" in question passage Q13 in FIG. 8 described above is based on a process result (a train line and a one-way fare) obtained from a route search system (not illustrated) by using the answer items of "departure station" and "destination station" extracted from answer passage A12 as arguments to execute the script.

As described above, according to the information processing apparatus 1 of the present example embodiment, it is possible to construe the meaning and content of a sentence input by a natural language and automatically perform a desired operation task without registering a large number of rules in advance.

Further, a plurality of operation systems 3 are introduced in many companies, and the operation methods thereof are often different for respective operation systems 3. In such a case, it takes time for a user to be familiar with the operation method of the system. In contrast, according to the information processing apparatus 1 of the present example embodiment, by a user simply answering in a natural language to one or more questions inquired via a common interaction application, it is possible to accept a process request to a desired operation system 3 and input/specification of data and automatically process the requested process instead of the user. Therefore, the user is no longer required to learn the operation method of the plurality of operation systems 3. As a result, this makes operations efficient.

Further, the script storage unit 20 that stores an RPA script used for performing a predetermined process on the operation system 3 for each operation task is provided, and the RPA execution unit 18 loads an RPA script corresponding to the operation task and executes the operation task based on the RPA script and an answer item (argument). Because of the configuration using a script, there is an advantage of easy implementation to the plurality of operation systems 3.

Further, when the extraction unit 14 extracts another answer item corresponding to another input item in addition to an answer item corresponding to an input item in an answer passage, the presentation unit 13 omits presentation of a question passage related to such another input item. Since this eliminates a need for a re-question when an answer item related to an unquestioned input item is obtained at the same time, it is possible to acquire an answer item efficiently in an interaction.

Further, when the extraction unit 14 extracts a plurality of answer items for a common input item from an answer passage, the presentation unit 13 presents a question passage to confirm an answer item corresponding to the input item. Accordingly, even when answer items corresponding to the input item for the first question are not refined to one answer item, it is possible to efficiently make a re-question to clarify the correspondence between the input item and the answer item.

In general, although the accuracy of a learning model obtained by machine learning can be increased by repeating learning, the accuracy may be low in an initial phase of learning. In the present example embodiment, however, by making a re-question based on the order of classification scores, an answer item to an input item can be extracted at high accuracy even when an answer passage such as "From Mita, I got off at Oshiage and went to Aoto" described above is input for the first time.

Furthermore, the user answer storage unit 15 that stores an answer item extracted from an answer passage and an answer passage of an extraction source is further provided. Accordingly, even when answer items corresponding to an input item are not refined to one answer item from a certain answer passage, the correspondence clarified by the re-question is stored as learning data (training data) and used in machine learning, and thereby an answer item can be extracted at high accuracy when a similar answer passage is input.

Second Example Embodiment

The information processing apparatus 1 according to a second example embodiment will be described below. Note that references common to the references provided in the drawings of the first example embodiment represent the same objects. Thus, features different from those of the first example embodiment will be described in detail.

Figure 11:
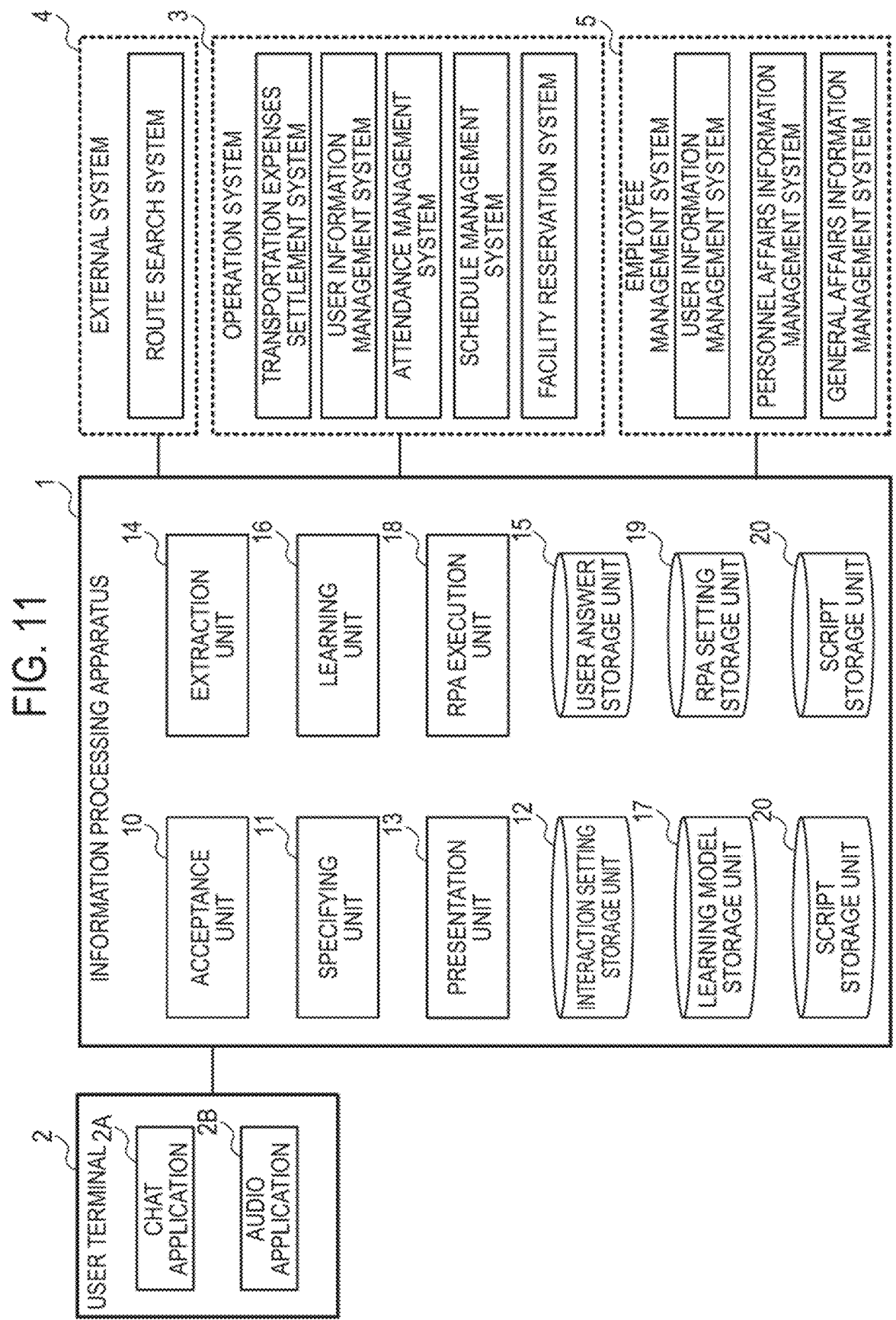
FIG. 11 is a block diagram illustrating the function of an information processing apparatus according to a second example embodiment.

FIG. 11 is a block diagram illustrating the function of the information processing apparatus 1 according to the second example embodiment. The information processing apparatus 1 according to the second example embodiment further has a monitoring unit 21. The monitoring unit 21 monitors registered data in the plurality of operation systems 3. The monitoring unit 21 then specifies an operation task related to adjustment of data when data associated with an input item are inconsistent among the plurality of operation systems 3 or in a predetermined case (for example, when data is associated with particular event information). When the monitoring unit 21 detects an inconsistency in data, the presentation unit 13 presents a message (task recommend passage) that proposes execution of a new operation task specified by the monitoring unit 21.

Further, the extraction unit 14 acquires user information on the user from the employee management system 5 (user information management system) and extracts an answer item corresponding to an input item from the user information. The extraction unit 14 then stores the extracted answer item in the user answer storage unit 15. The presentation unit 13 omits presentation of a question passage related to an input item overlapping the user information when using the user information.

Figure 12:
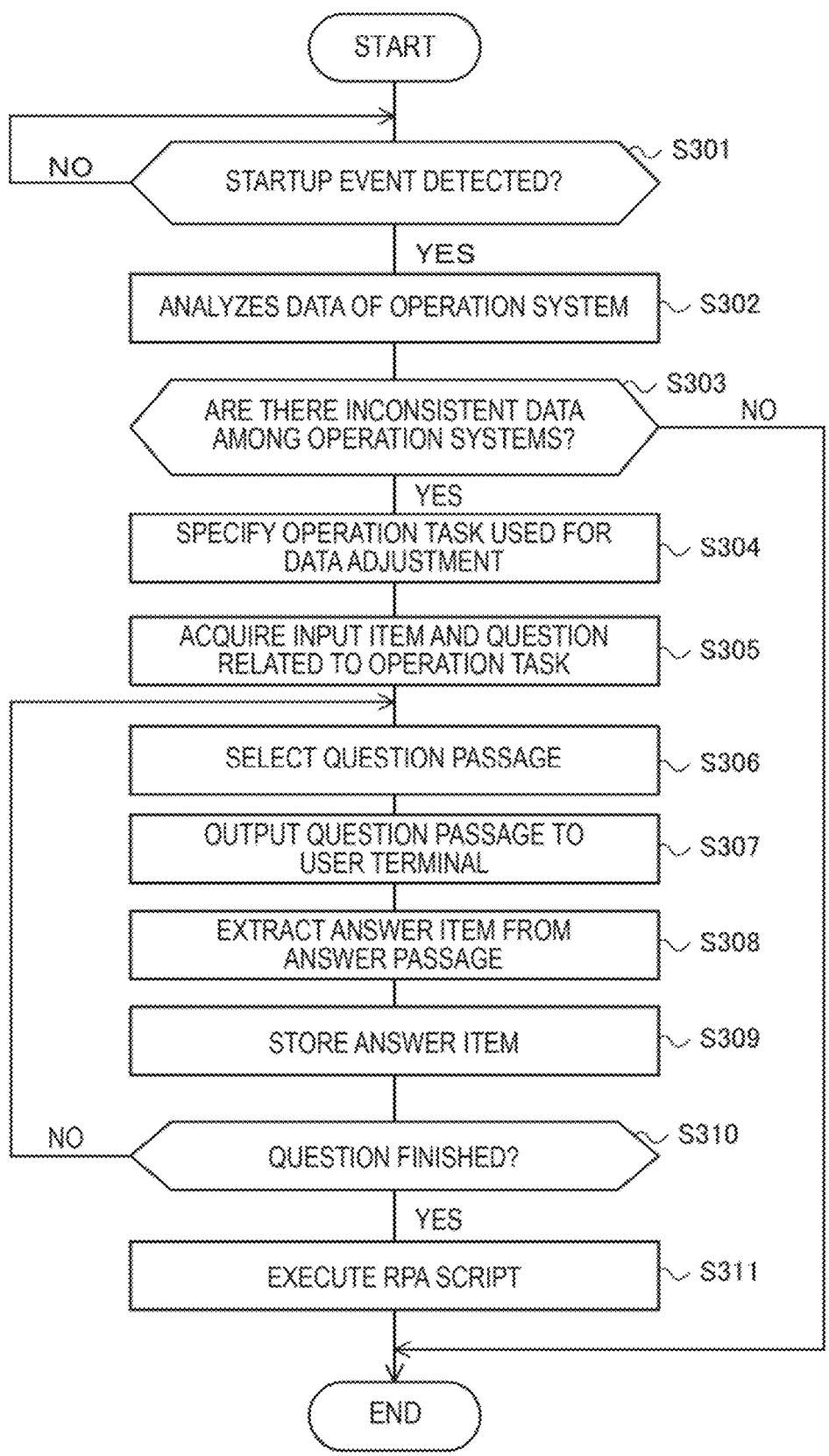
FIG. 12 is a flowchart illustrating one example of the information processing apparatus in the second example embodiment.
Figure 13:
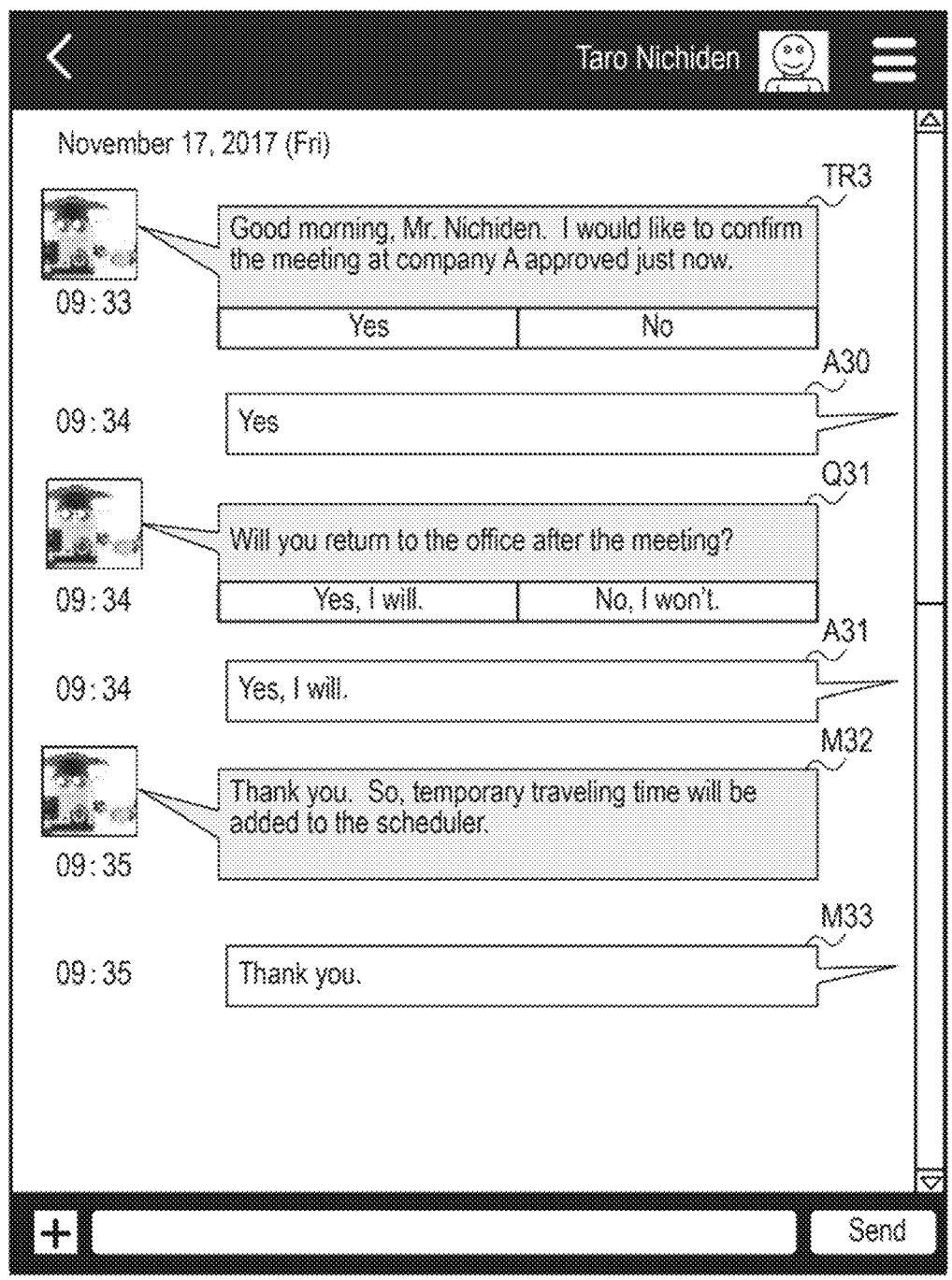
FIG. 13 is a diagram illustrating one example of an interactive window of a user terminal in the second example embodiment.
Figure 14:
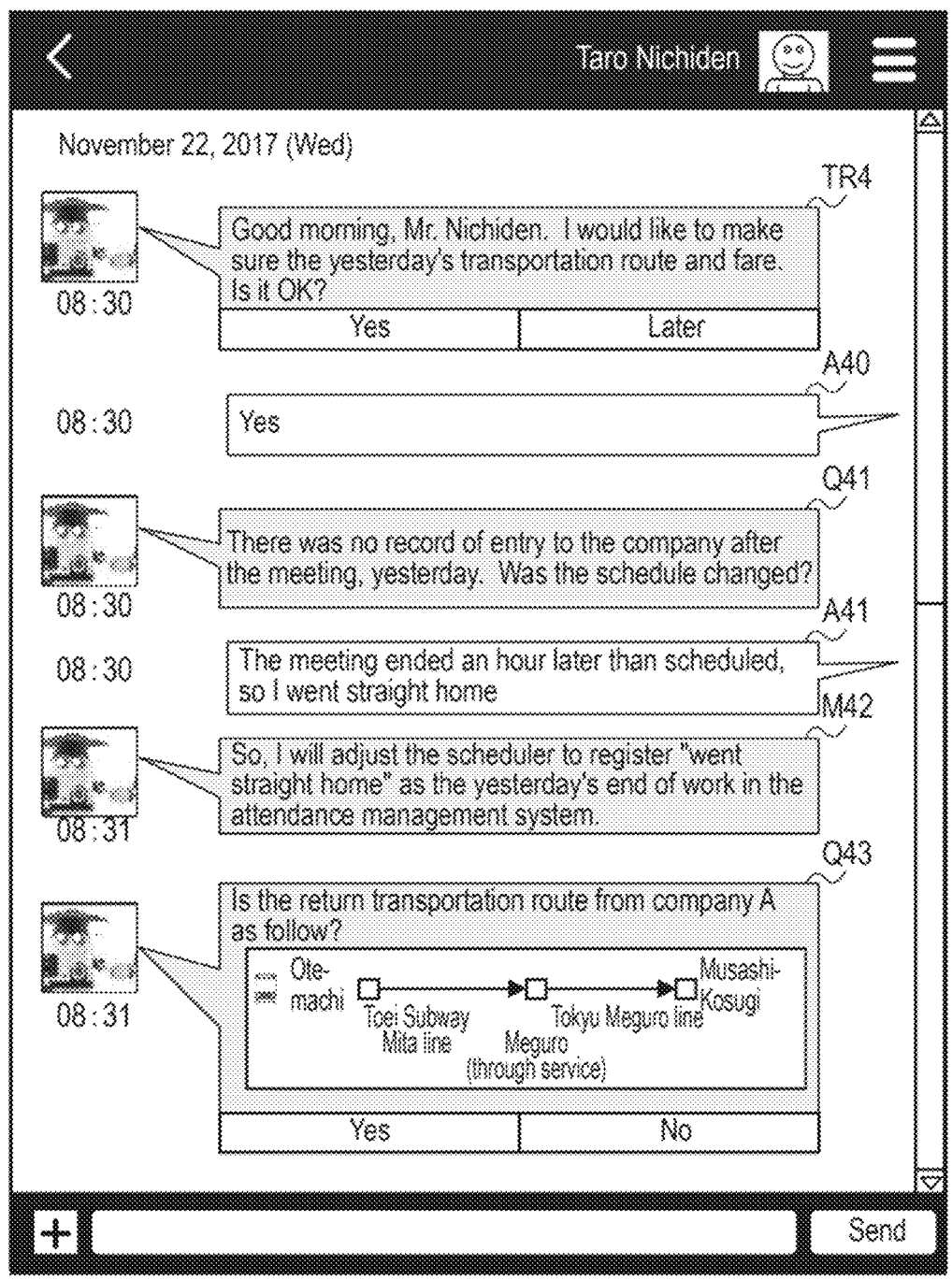
FIG. 14 is a diagram illustrating one example of an interactive window of the user terminal in the second example embodiment.

The operation of the information processing apparatus 1 according to the second example embodiment will be described below based on FIG. 12 to FIG. 14. FIG. 12 is a flowchart illustrating one example of the information processing apparatus 1 in the second example embodiment. Further, each of FIG. 13 and FIG. 14 is a diagram illustrating one example of an interactive window of the user terminal 2 in the second example embodiment.

First, the monitoring unit 21 determines whether or not a predetermined startup event is detected (step S301). Herein, if the monitoring unit 21 detects a startup event (step S301: YES), the monitoring unit 21 analyzes registered data related to the same user among the plurality of operation systems 3 (step S302). The startup event may be startup of the user terminal 2 being monitored or a registration/update event of data from the user terminal 2 to the operation system 3.

In step S303, the monitoring unit 21 determines whether or not there are inconsistent data among the plurality of operation systems 3. Herein, if the monitoring unit 21 determines that there are inconsistent data, the monitoring unit 21 specifies an operation task used for adjusting data and notifies the presentation unit 13 of the specified operation task and an input item to be adjusted (step S304).

The recommend passage TR3 ("Good morning, Mr. Nichiden. I would like to confirm the meeting at company A approved just now.") of the operation task illustrated in FIG. 13 is a sentence presented in response to a schedule being registered in a schedule management system, which is one of the operation systems 3, as a trigger from the user terminal 2. In this example, although the case where the user (Taro Nichiden) registers a schedule by himself is illustrated, there may be a case where a coworker (supervisor) of the user registers a schedule for the user. The monitoring unit 21 detects that a schedule after the end of meeting is not registered in the schedule management system and thereby notifies the presentation unit 13 of an input item to be adjusted.

Next, the presentation unit 13 acquires an input item and a question passage related to the operation task (step S305), selects a question passage of the input item to be adjusted (step S306), and in response, outputs the question passage to the user terminal 2 (step S307).

Next, in response to acquiring an answer passage input to the question passage at the user terminal 2, the extraction unit 14 extracts an answer item from the answer passage by performing text analysis on the answer passage (step S308). The extraction unit 14 stores the extracted answer item in the user answer storage unit 15 (step S309).

Next, the extraction unit 14 determines whether or not the question was finished for all the input items required for execution of the operation task (step S310). Herein, if the extraction unit 14 determines that the question was finished for all the input items (step S310: YES), the process proceeds to the process of step S311. In contrast, if the extraction unit 14 determines that the question was not finished (step S311: NO), the process returns to the process of step S306.

In step S311, the RPA execution unit 18 reads a script related to the operation task from the script storage unit 20. The RPA execution unit 18 then executes the script by using a setting value of an answer item read from the user answer storage unit 15 as an argument.

In the example of FIG. 13, Yes/No type question passage Q31 ("Will you return to the office after the meeting?") is presented, and answer passage A31 ("Yes, I will") is input. The information processing apparatus 1 presents the message M32 ("Thank you. So, temporary traveling time will be added to the scheduler.") to the user terminal 2 in response to the end of the question. The message M32 indicates that a script related to the operation task of schedule registration is executed to register the temporary schedule in the schedule management system.

Subsequently, an example of an interaction in FIG. 14 will be described. This interaction is started up when the information processing apparatus 1 detects startup of the user terminal 2 on the day after the meeting. First, recommend passage TR4 of an operation task ("Good morning, Mr. Nichiden. I would like to make sure the yesterday's transportation route and fare. Is it OK?") is presented. This indicates that, since the place and the time range of the meeting have been registered in the schedule management system, transportation expenses application is specified as an operation task necessary for the user.

Question passage Q41 ("There was no record of entry to the company after the meeting, yesterday. Was the schedule changed?") is a question indicating that an inconsistency in data is detected between the schedule management system (scheduler) and an entry/exit management system. An operation task of transportation expenses application is specified as a parent task due to answer A40 responding to recommend passage TR4. Further, it is indicated that an operation task of reschedule can be specified and presented as a child task in association with the parent task.

In response to answer passage A41 to question passage Q41 ("The meeting ended an hour later than scheduled, so I went straight home") being input, message M42 ("So, I will adjust the scheduler to register "went straight home" as the yesterday's end of work in the attendance management system.") is presented. Message M42 indicates that answer passage A41 is analyzed and data adjustment is automatically performed for both the schedule management system and the attendance management system.

In question passage Q43 ("Is the return transportation route from company A as follow?"), a search result of the transportation route between the company A and the user's home is presented. The transportation route is acquired by using "departure station" and "destination station" as arguments to request a search result from the route search system, which is the external system 4.

In the example of the interaction illustrated in FIG. 14, a case is illustrated where a place of the meeting ("Otemachi") is extracted from registered data in the schedule management system, for example, for "departure station", and the nearest station of the user's home ("Musashi-Kosugi") is extracted from the user information management system, for example, for "destination station", which are automatically set.

That is, the information processing apparatus 1 acquires system possession information associated with the user from the user information management system and stores the acquired system possession information in the user answer storage unit 15 in association with a predetermined answer item in advance. In acquisition, an employee number is used as a key, for example. Note that the system from which data is acquired is not limited to the user information management system. As specific examples, "home nearest station", "company nearest station", "approver information", "census register name", "position", "home address information", or the like may be acquired as information unique to the user from the personal affairs information management system. Similarly, when there is a system that manages information on a customer company, company information, address information, or the like on another company can be acquired. The acquired information can be utilized when being the input item at execution of an operation task in the operation system 3 including various systems.

As described above, according to the information processing apparatus 1 of the second example embodiment, by monitoring data accumulated in the operation systems 3, it is possible to estimate and present an operation task required for the user when an inconsistency (discrepancy or contradiction) in data is detected for an input item having association between different operation systems 3. Accordingly, it is possible to correct the inconsistency in data eventually. In the example described above, data is consistent between both systems of the schedule management system and the transportation expenses application system. Further, since information required for execution of an operation task can be automatically extracted from the operation system 3 side and utilized, the number of questions presented to the user terminal 2 may be reduced, and an operation task may be efficiently executed.

Further, the monitoring unit 21 recommends an operation task not only when data are inconsistent between systems but also when data are associated with particular event information. For example, when data of a company name such as "company A" or a place name such as "Otemachi" is registered as a destination of a business trip in the schedule management system and when a meeting room name such as "meeting room 234" is in a facility reservation system, an event of a meeting outside the company is detected, and required data are adjusted/registered.

Third Example Embodiment

Figure 15:
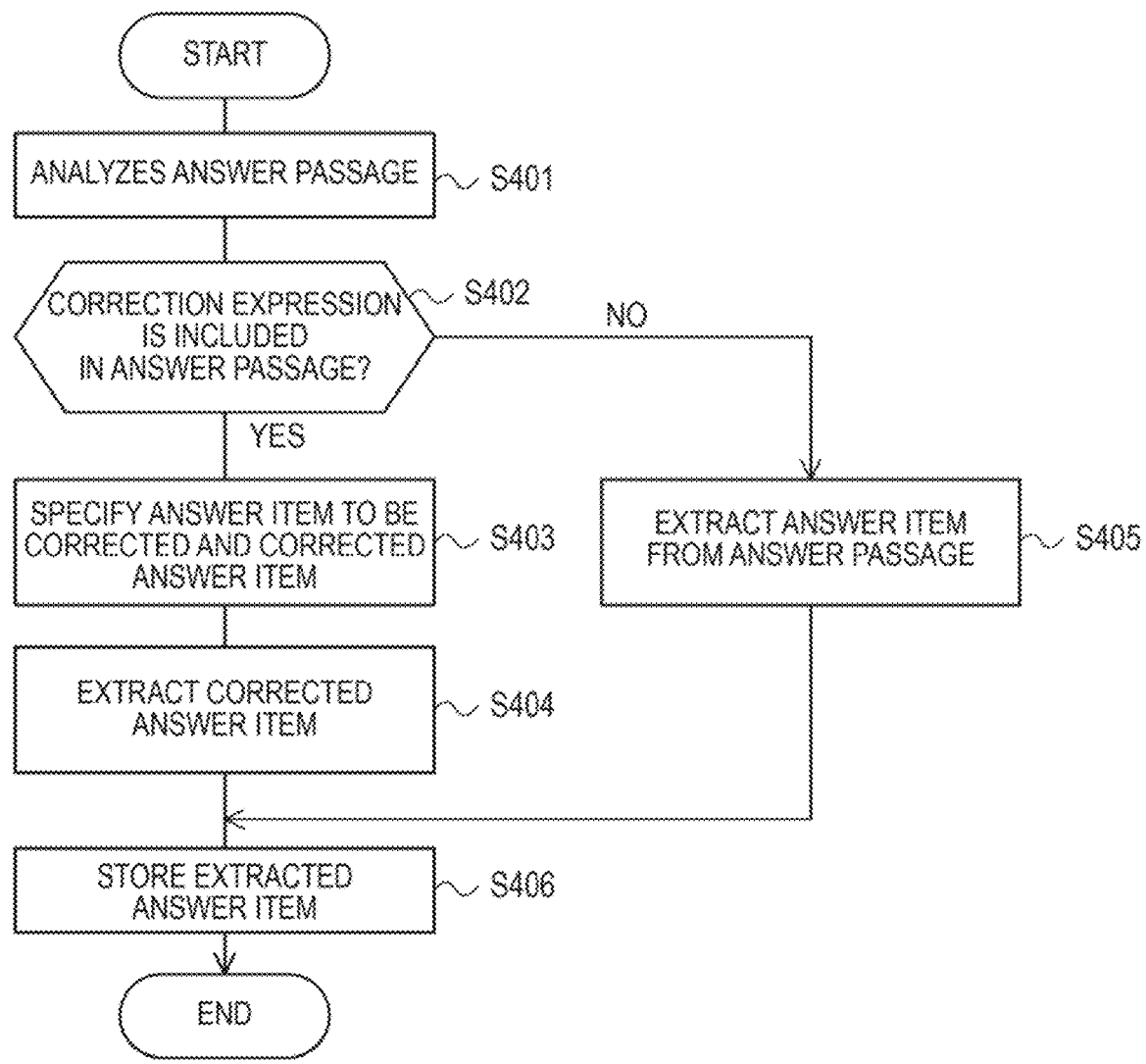
FIG. 15 is a flowchart illustrating one example of the information processing apparatus in a third example embodiment.
Figure 16:
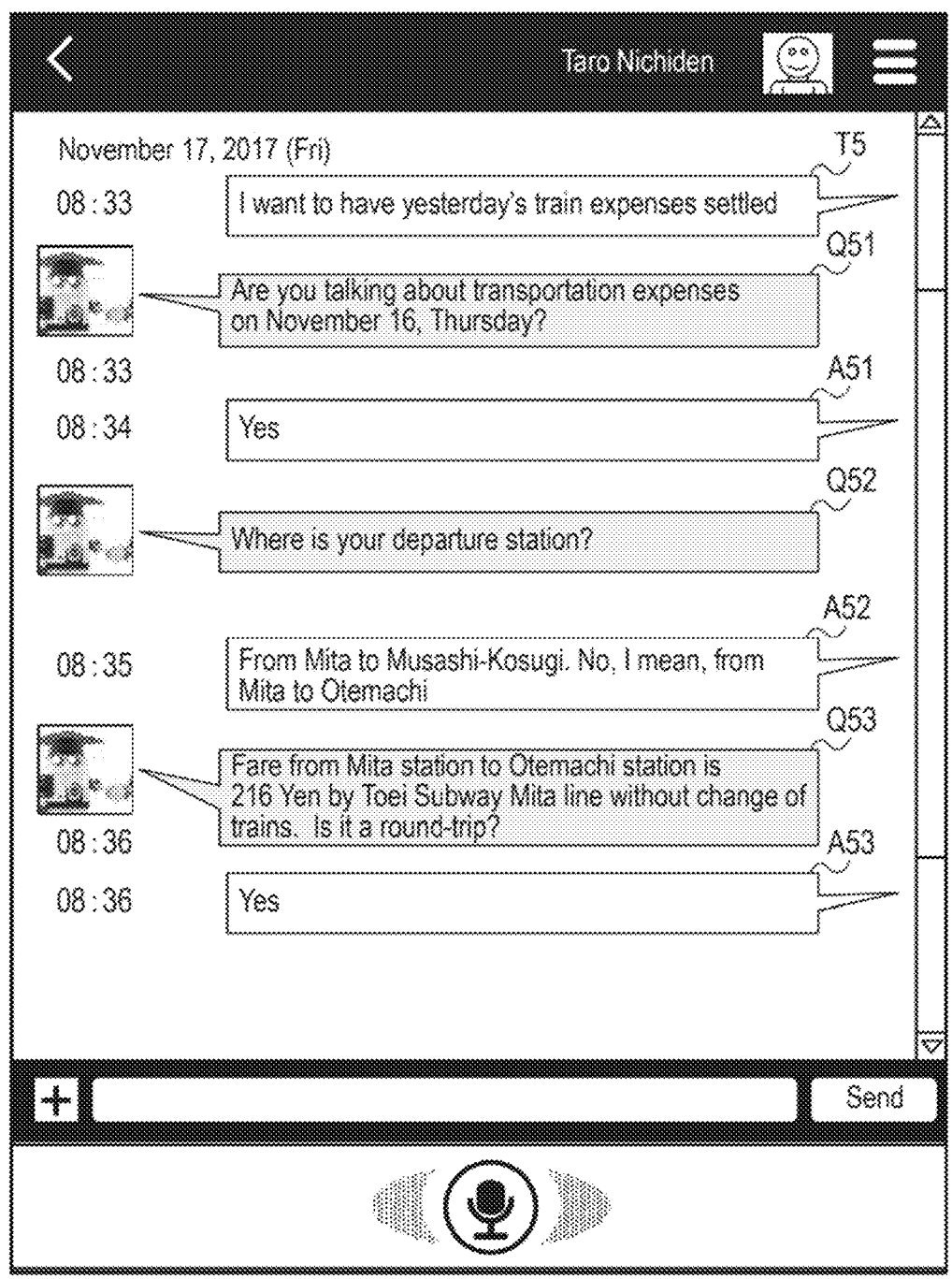
FIG. 16 is a diagram illustrating one example of an interactive window of the user terminal in a third example embodiment.

The operation of the information processing apparatus 1 according to a third example embodiment will be described below based on FIG. 15 and FIG. 16. FIG. 15 is a flowchart illustrating one example of the information processing apparatus 1 in the third example embodiment. FIG. 16 is a diagram illustrating one example of an interactive window of the user terminal 2 in the third example embodiment. Note that the mark of a microphone illustrated in FIG. 16 indicates that each answer is input by voice input.

The extraction unit 14 of the information processing apparatus 1 analyzes an answer passage input at the user terminal 2 (step S401) and determines whether or not a correction expression is included in the answer passage (step S402). Herein, if the extraction unit 14 determines that a correction expression is included (step S402: YES), the extraction unit 14 specifies an answer item to be corrected from the answer passage (step S403) and extracts a corrected answer item (step S404). A method of detecting a correction expression such as "No, I mean", "was a mistake", or the like from an answer passage may be a method of detection in a rule base based on a regular expression or a method of using machine learning. Note that similar processing may be applied not only when correction is immediately expressed in a single answer passage but also when correction is expressed afterward for an answered input item in an interaction related to the same operation task.

In contrast, if the extraction unit 14 determines that no correction passage is included in the answer passage (step S402: NO), the extraction unit 14 extracts an answer item corresponding to an input item from the answer passage (step S405). In step S406, the extraction unit 14 stores the extracted answer item in the user answer storage unit 15.

In the example of the interaction illustrated in FIG. 16, an operation task of transportation expenses application is specified and a plurality of question passages corresponding to the input item are presented, and answer passage A52 ("From Mita to Musashi-Kosugi. No, I mean, from Mita to Otemachi") input by voice includes a correction expression ("Musashi-Kosugi. No, I mean, from Mita to Otemachi") to correct "destination station" from "Musashi-Kosugi" to "Otemachi". Note that it is considered that, when the content of the answer passage is "From Mita to Musashi-Kosugi. No, I mean, Otemachi", the information processing apparatus 1 may be unable to determine whether "Otemachi" is an item for correcting "Mita" or "Musashi-Kosugi". When the content of the answer passage can be construed in multiple meanings, a re-question such as "From Mita station to Otemachi station?" is made, for example.

The next question passage Q53 ("Fare from Mita station to Otemachi station is 216 Yen by Toei Subway Mita line without change of trains. Is it a round-trip?") in response to answer passage A52 indicates that "Otemachi station" is extracted as an answer item of "destination station" from the corrected passage and route search was performed.

According to the information processing apparatus 1 of the third example embodiment, correction can be easily performed for an answer item answered in an interaction. In particular, this is effective when interaction processing is performed via voice between the user terminal 2 and the information processing apparatus 1, because the answered content cannot be deleted and therefore restatement would otherwise be necessary.

Fourth Example Embodiment

Figure 17:
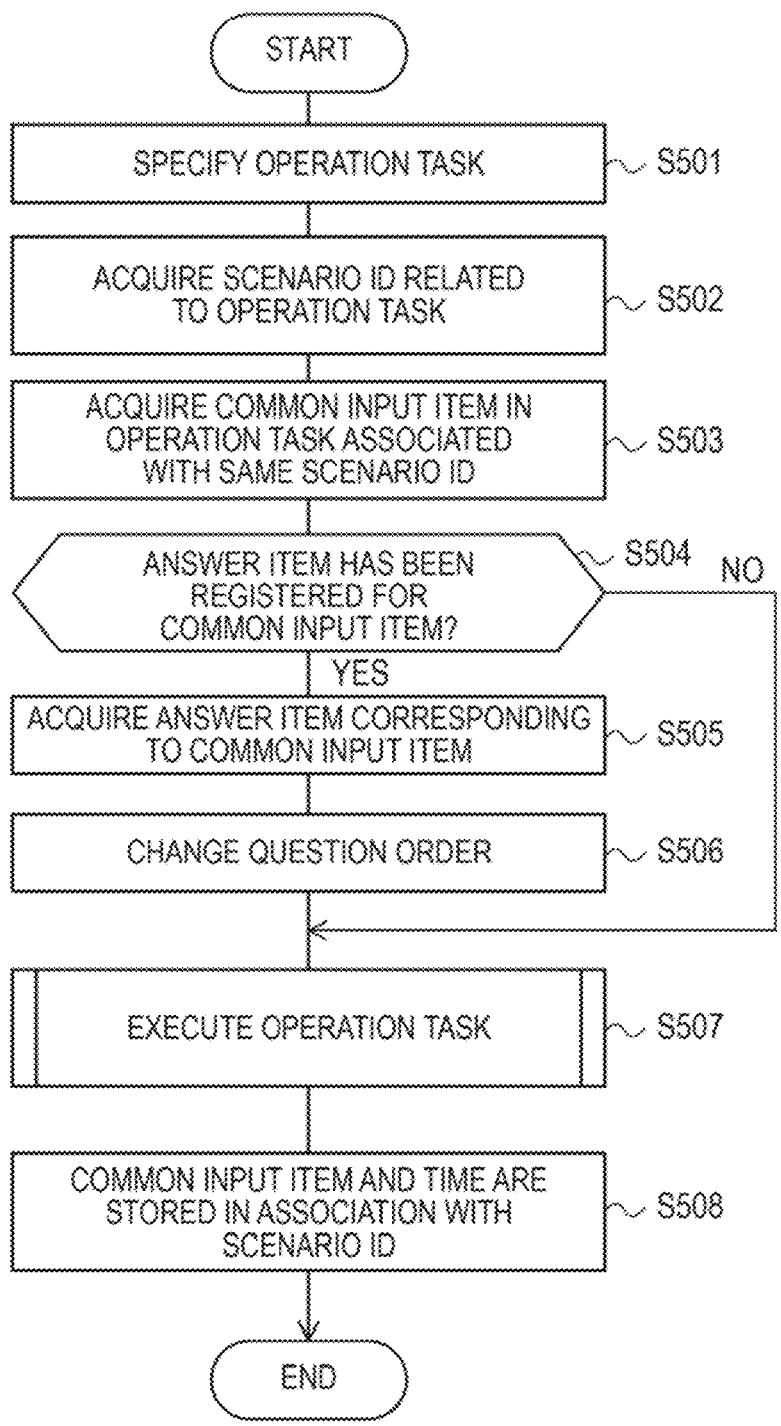
FIG. 17 is a flowchart illustrating one example of the information processing apparatus in a fourth example embodiment.

The operation of the information processing apparatus 1 according to a fourth example embodiment will be described below based on FIG. 17 and FIG. 18. The present example embodiment is different from the example embodiments described above in that information acquired in an operation task executed earlier is utilized in an operation task executed later. FIG. 17 is a flowchart illustrating one example of the information processing apparatus 1 in the fourth example embodiment. In this example, a case where the operation system 3 is a delivery management system is illustrated.

First, the specifying unit 11 of the information processing apparatus 1 specifies an operation task from a task-specifying passage input from the user terminal (step S501) and acquires a scenario ID into which an operation task ID is classified (step S502).

Next, the extraction unit 14 references the interaction setting storage unit 12 and searches a common input item (hereafter, referred to as "common input item") from the operation task associated with the same scenario ID (step S503).

Next, the extraction unit 14 references the user answer storage unit 15 based on the input item ID of the common input item and determines whether or not the answer item for the common input item has already been registered/stored (step S504). Herein, if the extraction unit 14 determines that the answer item to the common input item has already been stored (step S504: YES), the extraction unit 14 acquires data of the answer item for the common input item from the user answer storage unit 15 (step S505) and changes the order of questions required for the operation task specified in step S501 (step S506). That is, since the answer item has been fixed for the common input item, the question is omitted.

Next, the information processing apparatus 1 extracts an answer item corresponding to an input item required for execution of the operation task in an interactive form and executes the operation task (step S507).

Then, upon completion of the execution of the operation task for the operation system 3, the answer item corresponding to the common input item and the time when the answer item is set are stored in association with the scenario ID (step S508), and the process ends.

Figure 18:
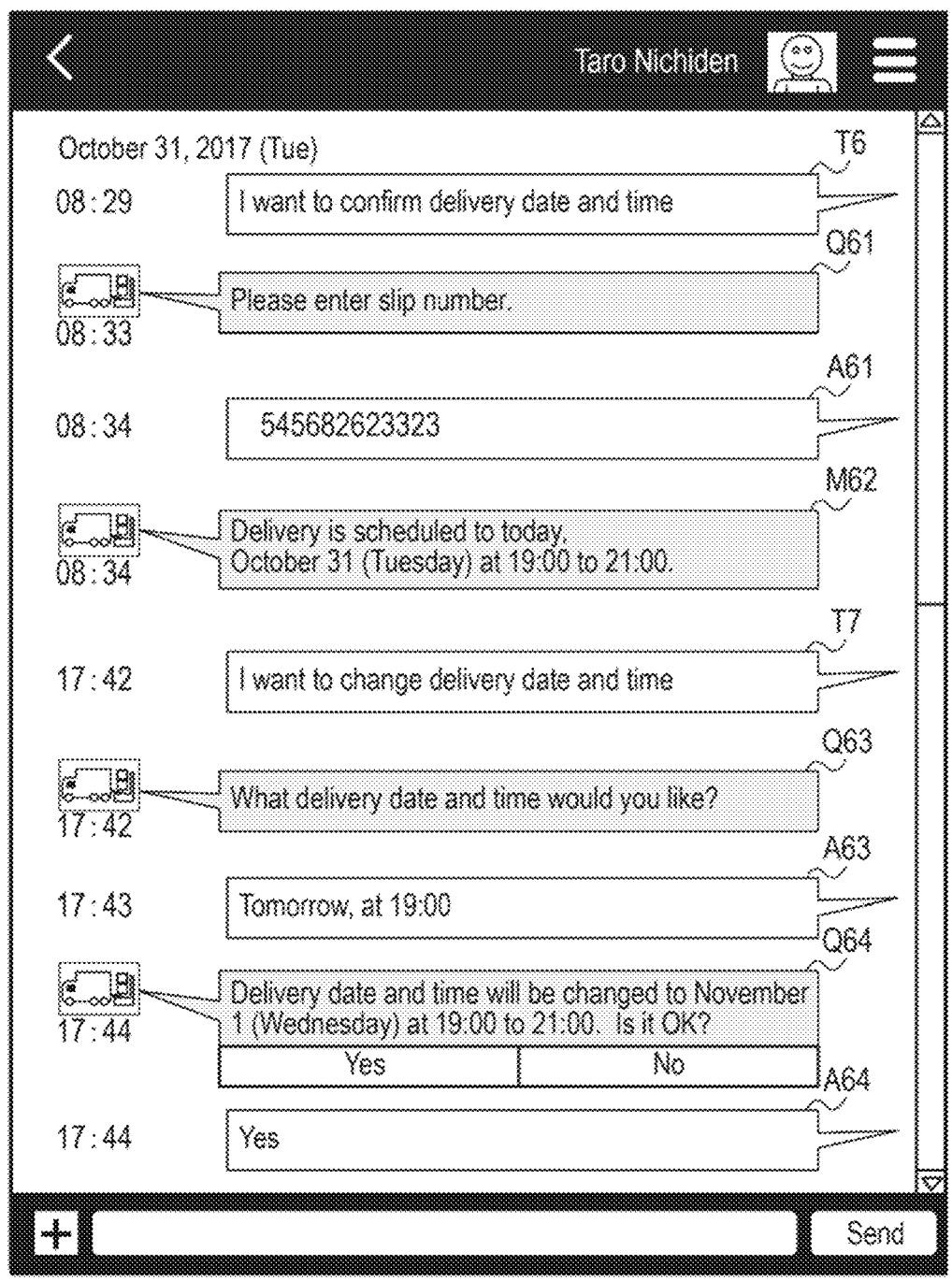
FIG. 18 is a diagram illustrating one example of an interactive window of the user terminal in a fourth example embodiment.

FIG. 18 is a diagram illustrating one example of an interactive window of the user terminal 2 in the fourth example embodiment. Note that description will be provided under the assumption that operation tasks of confirmation of delivery date and time and change of delivery date and time are classified into the same scenario ID and "slip number" is the common input item to the two operation tasks.

In FIG. 18, first, task-specifying passage T6 ("I want to confirm delivery date and time") is input from the user, an operation task of confirmation of delivery date and time is specified, and thereby question passage Q61 ("Please enter slip number.") related to confirmation of delivery date and time is presented.

In response to the user entering answer passage A61 including a slip number to question passage Q61, the information processing apparatus 1 presents message M62 ("Delivery is scheduled to today, October 31 (Tuesday) at 19:00 to 21:00.") and completes the operation task of confirmation of delivery date and time.

Subsequently, new task-specifying passage T7 ("I want to change delivery date and time") is input after some period of time in a day of execution of the operation task of confirmation of delivery date and time. The operation task of confirmation of delivery date and time is specified in response to task-specifying passage T7, and thereby question passage Q63 ("What delivery date and time would you like?") related to change of delivery date and time is presented. A question passage of "Please enter slip number." is supposed to be initially presented because new task-specifying passage T7 is input, however, since the operation task of confirmation of delivery date and time was executed on the same day and the slip number has already been input, entry of a slip number is omitted.

Then, answer passage A63 ("Tomorrow, at 19:00") to question passage Q63 is analyzed, and thereby the last question passage Q64 ("Delivery date and time will be changed to November 1 (Wednesday) at 19:00 to 21:00, is it OK?") is presented.

According to the information processing apparatus of the fourth example embodiment, when a separate operation task classified into the same scenario ID has already been executed, a setting value of an answer item corresponding to a common input item can be reused at execution of a new operation task. Thus, when a new task-specifying passage is input, since it is no longer necessary to present a question passage related to the common input item, it is possible to execute an associated operation task continuously and thus effectively.

Fifth Example Embodiment

Figure 19:
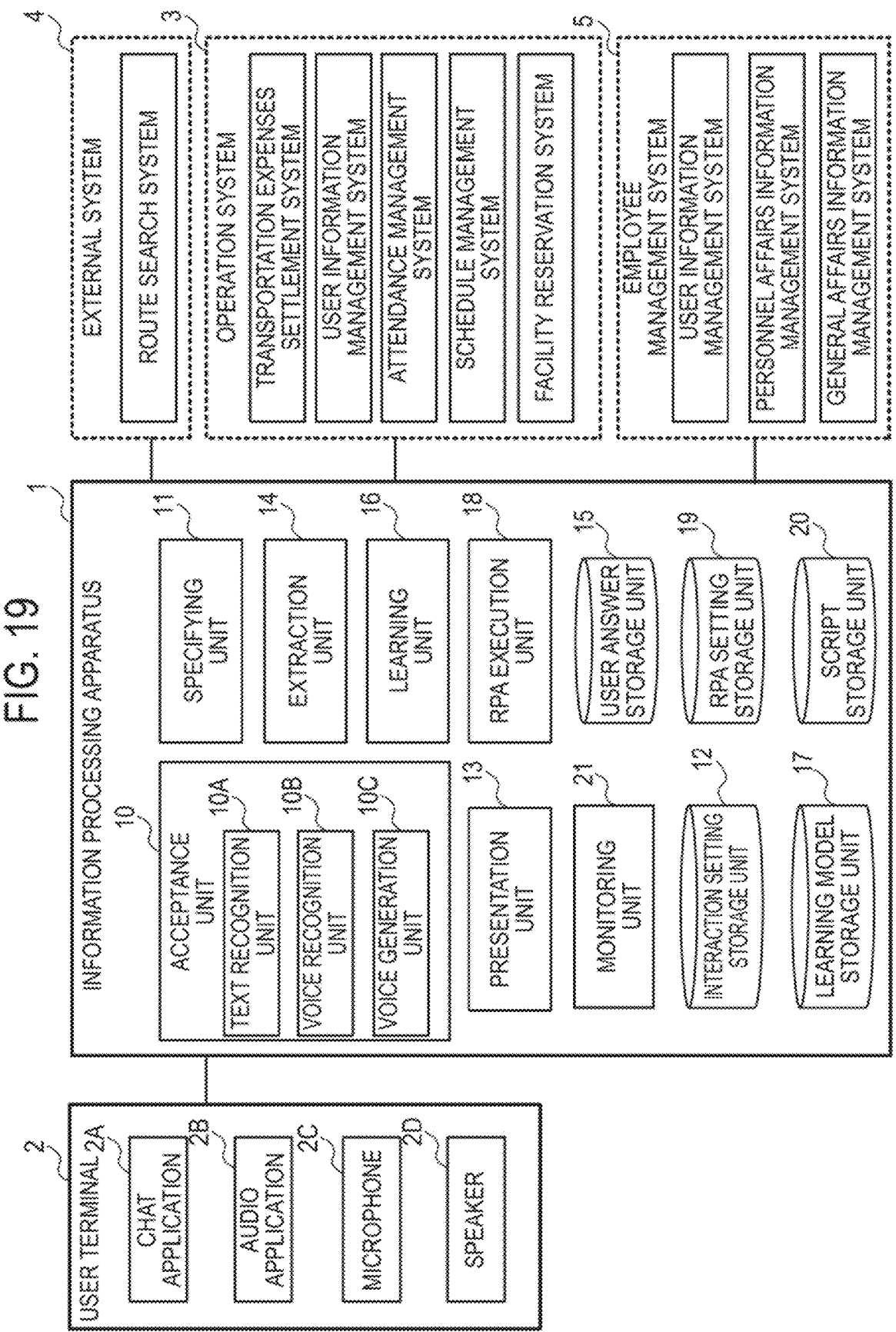
FIG. 19 is a block diagram illustrating the function of an information processing apparatus in a fifth example embodiment.

FIG. 19 is a block diagram illustrating the function of the information processing apparatus 1 in a fifth example embodiment. Herein, the acceptance unit 10 has a text recognition unit 10A, a voice recognition unit 10B, and a voice generation unit 10C. Further, the user terminal 2 has a microphone 2C used for voice input and a speaker 2D used for voice output in addition to a chat application 2A and an audio application 2B. Note that the microphone 2C and the speaker 2D may be an integrated type as a hearable device (wireless earphone).

The text recognition unit 10A of the acceptance unit 10 recognizes text information transmitted from the chat application 2A of the user terminal 2 and outputs the text information to the specifying unit 11 and the extraction unit 14. The voice recognition unit 10B recognizes voice input from the microphone 2C of the user terminal 2, converts the voice into text information, and outputs the text information to the specifying unit 11 and the extraction unit 14. The processes in the specifying unit 11 and the extraction unit 14 are the same as those performed when text information is input from the text recognition unit 10A. The voice generation unit 10C generates an audio file from text information of a question passage when determining the question passage corresponding to an operation task based on a task-specifying passage in the presentation unit 13. The voice generation unit 10C then outputs the audio file to the user terminal 2 via the presentation unit 13. In response, at the user terminal 2, voice of the audio file is output from the speaker 2D via the audio application 2B.

That is, in the present example embodiment, entry of a task-specifying passage, presentation of a question, and entry of an answer can be performed via voice between the user terminal 2 and the information processing apparatus 1. According to the present example embodiment, it is no longer necessary to manually enter text information on the user terminal 2, and it is possible to more easily execute an operation task.

Sixth Example Embodiment

Figure 20:
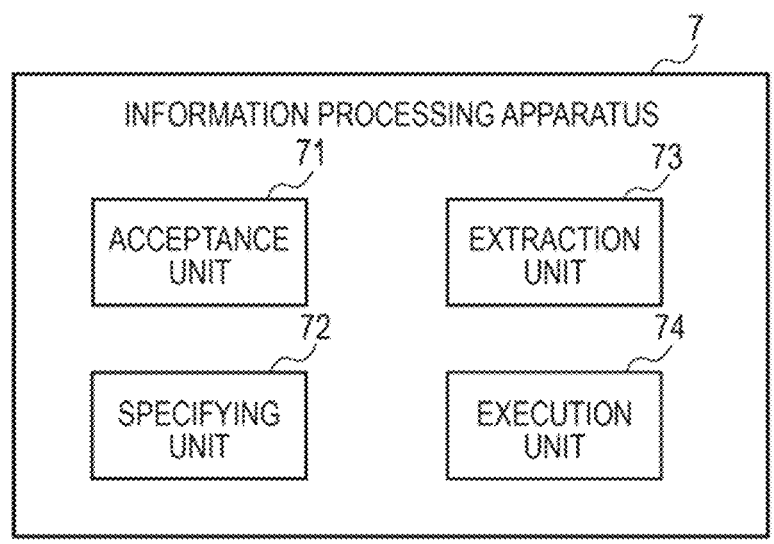
FIG. 20 is a block diagram illustrating the function of an information processing apparatus according to a sixth example embodiment.

FIG. 20 is a block diagram illustrating the function of an information processing apparatus 7 according to a sixth example embodiment. The information processing apparatus 7 according to the sixth example embodiment includes an acceptance unit 71 that accepts a process request to an operation system, a specifying unit 72 that, based on the process request, specifies an operation task to be executed in the operation system, an extraction unit 73 that performs text analysis on the process request and extracts an answer item corresponding to an input item required at execution of the operation task from the process request, and an execution unit 74 that executes the operation task based on the answer item.

According to the information processing apparatus 7 of the sixth example embodiment, it is possible to accurately analyze an input natural language and automatically set an input item required in the operation of an operation system without requiring pre-registration of a large number of rules.

Modified Example Embodiment

While the present invention has been described above with reference to the example embodiments, the present invention is not limited to the example embodiments described above. Various modifications that may be understood by those skilled in the art can be made to the configuration and details of the present invention within the scope not departing from the spirit of the present invention. For example, it should be understood that an example embodiment in which a part of the configuration of any of the example embodiments is added to another example embodiment or an example embodiment in which a part of the configuration of any of the example embodiments is replaced with a part of the configuration of another example embodiment is also one of the example embodiments to which the present invention may be applied.

For example, while the case where the operation system 3 that executes an operation task is a transportation expenses application system or a delivery management system has been described in the above example embodiments, targeted operation systems 3 are not limited thereto. Some use cases will be described below.

(1) In a case of a facility reservation system, an operation task may be search for an available facility such as a meeting room, reservation of a facility, confirmation of a reservation, cancellation of a reservation, or the like. By specifying an operation task with an interaction process via texts or voices and executing the specified operation task, it is possible to improve usage efficiency of a facility.

(2) In a case of an attendance management system, an operation task may be confirmation of a work record, admission of a work record, application of leave, approval of application of leave, or the like performed by the user of interest or a supervisor of the user.

(3) In a case of a building entry application system, an operation task may be application of entry to a building, cancellation of application of entry to a building, change of application of entry to a building, or the like. In each case of (1) to (3), it is not necessary for the user to directly access an entry window of the operation system 3 to manually set required input items, and it is possible to automatically set input items during an interaction and easily and efficiently execute an operation task.

Further, the scope of each of the example embodiments includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a compact disc-read only memory (CD-ROM), a magnetic tape, a nonvolatile memory card, or a ROM can be used. Further, the scope of each of the example embodiments includes an example that operates on operating system (OS) to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An information processing apparatus comprising:

an acceptance unit that accepts a process request to an operation system;

a specifying unit that, based on the process request, specifies an operation task to be executed in the operation system;

an extraction unit that performs text analysis on the process request and extracts an answer item corresponding to an input item required at execution of the operation task from the process request; and an execution unit that executes the operation task based on the answer item.

(Supplementary Note 2)

The information processing apparatus according to supplementary note 1, wherein the extraction unit performs an implication recognition process as the text analysis.

(Supplementary Note 3)

The information processing apparatus according to supplementary note 1 or 2 further comprising a storage unit that stores, for each operation task, a script used for causing the operation system to perform a predetermined process, wherein the execution unit execute the operation task based on the script corresponding to the operation task and on the answer item.

(Supplementary Note 4)

The information processing apparatus according to any one of claims 1 to 3 further comprising a presentation unit that specifies the input item corresponding to the operation task specified by the specifying unit and presents a question passage related to the input item, wherein the acceptance unit accepts an answer passage to the question passage, and wherein the extraction unit performs the text analysis on the answer passage and extracts the answer item corresponding to the input item from the answer passage.

(Supplementary Note 5)

The information processing apparatus according to supplementary note 4, wherein when the extraction unit extracts another answer item corresponding to another input item in addition to the answer item corresponding to the input item from the answer passage, the presentation unit omits presentation of the question passage related to the another input item.

(Supplementary Note 6)

The information processing apparatus according to supplementary note 4 or 5, wherein when the extraction unit extracts a plurality of answer items for a common input item from the answer passage, the presentation unit presents the question passage used for confirming the answer item corresponding to the input item.

(Supplementary Note 7)

The information processing apparatus according to supplementary note 6, wherein the presentation unit calculates respective classification scores indicating correlation degrees between the input item and the answer items and presents the question passage based on order of the classification scores.

(Supplementary Note 8)

The information processing apparatus according to any one of supplementary notes 4 to 7 further comprising a user answer storage unit that stores the answer item extracted from the answer passage and the answer passage of an extraction source.

(Supplementary Note 9)

The information processing apparatus according to any one of supplementary notes 4 to 8, wherein the extraction unit acquires system possession information possessed by the operation system in association with a user who provides the process request and extracts the answer item corresponding to the input item from the system possession information, and wherein the presentation unit omits presentation of the question passage related to the input item overlapping the system possession information.

(Supplementary Note 10)

The information processing apparatus according to any one of supplementary notes 4 to 9 further comprising a monitoring unit that, when data associated with the input item are inconsistent among a plurality of operation systems or when the data are associated with a predetermined event information, specifies the operation task to adjust the data, wherein the presentation unit presents a message that proposes execution of the operation task specified by the monitoring unit.

(Supplementary Note 11)

The information processing apparatus according to any one of supplementary notes 4 to 10, wherein when a correction expression for the answer item is included in the answer passage, the extraction unit specifies an answer item to be corrected and a corrected answer item from the answer passage and replaces the answer item to be corrected with the corrected answer item.

(Supplementary Note 12)

An information processing method comprising:
accepting a process request to an operation system;
based on the process request, specifying an operation task to be executed in the operation system;
performing text analysis on the process request and extracting an answer item corresponding to an input item required at execution of the operation task from the process request; and
executing the operation task based on the answer item.

(Supplementary Note 13)

A storage medium storing a program that causes a computer to perform:
accepting a process request to an operation system;
based on the process request, specifying an operation task to be executed in the operation system;
performing text analysis on the process request and extracting an answer item corresponding to an input item required at execution of the operation task from the process request; and
executing the operation task based on the answer item.

REFERENCE SIGNS LIST 1, 7 information processing apparatus
2 user terminal
2A chat application
2B audio application
2C microphone
2D speaker
3 operation system
4 external system
5 employee management system
10 acceptance unit
10A text recognition unit
10B voice recognition unit
10C voice generation unit
11 specifying unit
12 interaction setting storage unit
13 presentation unit
14 extraction unit
15 user answer storage unit
16 learning unit
17 learning model storage unit
18 RPA execution unit
19 RPA setting storage unit
20 script storage unit
71 acceptance unit
72 specifying unit
73 extraction unit
74 execution unit
101 CPU
102 memory
103 storage device
104 communication interface
105 input device
106 display device

The invention claimed is:

1. An information processing apparatus comprising:
at least one memory configured to store instructions; and
at least one processor configured to execute the instructions to:
accept a task declaration passage input from a user;
analyze the task declaration passage to specify a task;
specify an input data required at execution of the task;
present a question passage related to the input data to the user;
analyze an answer passage to the question passage input from the user;
extract an answer data corresponding to the input data from the answer passage; and
register correspondence between the input data and the answer data.

2. The information processing apparatus according to claim 1, wherein the at least one processor performs an implication recognition process as the analysis of the task declaration passage and the answer passage.

3. The information processing apparatus according to claim 1, further comprising a storage to store input data lists corresponding to each of a plurality of the tasks and a plurality of the question passages respectively corresponding to each of a plurality of the input data.

4. The information processing apparatus according to claim 3, wherein the at least one processor is configured to present the question passage as specified from the storage.

5. An information processing method comprising:
accepting, by a processor, a task declaration passage input from a user;
analyzing, by the processor, the task declaration passage to specify a task;
specifying, by the processor, an input data required at execution of the task;
presenting, by the processor, a question passage related to the input data to the user;
analyzing, by the processor, an answer passage to the question passage input from the user;
extracting, by the processor, an answer data corresponding to the input data from the answer passage; and
registering, by the processor, correspondence between the input data and the answer data.

6. A non-transitory storage medium storing a program that causes a computer to perform:
accepting a task declaration passage input from a user;
analyzing the task declaration passage to specify a task;
specifying an input data required at execution of the task;
presenting a question passage related to the input data to the user;
analyzing an answer passage to the question passage input from the user;
extracting an answer data corresponding to the input data from the answer passage; and
registering correspondence between the input data and the answer data.

* * * * *